US011875367B2

(12) United States Patent
Ouellet et al.

(10) Patent No.: US 11,875,367 B2
(45) Date of Patent: *Jan. 16, 2024

(54) SYSTEMS AND METHODS FOR DYNAMIC DEMAND SENSING

(71) Applicant: Kinaxis Inc., Ottawa (CA)

(72) Inventors: Sebastien Ouellet, Ottawa (CA); Zhen Lin, Ottawa (CA); Christopher Wang, Ottawa (CA); Chantal Bisson-Krol, Ottawa (CA)

(73) Assignee: Kinaxis Inc., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/987,401

(22) Filed: Nov. 15, 2022

(65) Prior Publication Data

US 2023/0085704 A1 Mar. 23, 2023

Related U.S. Application Data

(63) Continuation of application No. 16/599,143, filed on Oct. 11, 2019, now Pat. No. 11,526,899.

(51) Int. Cl.
| | |
|---|---|
| *G06Q 10/06* | (2023.01) |
| *G06Q 10/08* | (2023.01) |
| *G06Q 30/02* | (2023.01) |
| *G06Q 30/06* | (2023.01) |
| *G06Q 30/0201* | (2023.01) |
| *G06Q 30/0202* | (2023.01) |
| *G06N 20/00* | (2019.01) |
| *G06F 18/214* | (2023.01) |
| *G06F 18/21* | (2023.01) |

(52) U.S. Cl.
CPC ....... *G06Q 30/0201* (2013.01); *G06F 18/214* (2023.01); *G06F 18/217* (2023.01); *G06N 20/00* (2019.01); *G06Q 30/0202* (2013.01)

(58) Field of Classification Search
CPC ........ G06Q 10/06; G06Q 10/08; G06Q 30/02; G06Q 30/06
USPC ...................................................... 705/7.31
See application file for complete search history.

(56) References Cited

U.S. PATENT DOCUMENTS

| | | |
|---|---|---|
| 7,257,513 B2 | 8/2007 | Lilly |
| 7,792,353 B2 | 9/2010 | Forman et al. |
| 9,218,574 B2 | 12/2015 | Phillipps et al. |
| 9,785,951 B1 | 10/2017 | Coleman et al. |

(Continued)

FOREIGN PATENT DOCUMENTS

| | | |
|---|---|---|
| CA | 3057521 A1 | 9/2018 |
| JP | 2018147261 A | 9/2018 |
| WO | 2019055957 A1 | 3/2019 |

OTHER PUBLICATIONS

International Search Report from related PCT International Application No. PCT/CA2020/051347, dated Jan. 8, 2021.

(Continued)

*Primary Examiner* — Nga B Nguyen
(74) *Attorney, Agent, or Firm* — Borden Ladner Gervais LLP; Jeffrey Coghlan

(57) ABSTRACT

Systems and methods for dynamic demand sensing in a supply chain in which constantly-updated data is used to select a machine learning model or retrain a pre-selected machine learning model, for forecasting sales of a product at a specific location. The updated data includes product information and geographic information.

21 Claims, 13 Drawing Sheets

(56) References Cited

U.S. PATENT DOCUMENTS

| | | | |
|---|---|---|---|
| 10,002,329 | B2 | 6/2018 | Mehanna et al. |
| 10,102,476 | B2 | 10/2018 | Caraviello et al. |
| 10,192,243 | B1 | 1/2019 | Genc-Kaya et al. |
| 10,255,550 | B1 | 4/2019 | Simkoff et al. |
| 10,402,788 | B2 | 9/2019 | Morrow et al. |
| 11,526,899 | B2* | 12/2022 | Ouellet .............. G06Q 30/0201 |
| 11,537,825 | B2 | 12/2022 | Ouellet et al. |
| 2010/0088344 | A1 | 4/2010 | Treat et al. |
| 2010/0138273 | A1 | 6/2010 | Bateni et al. |
| 2012/0303411 | A1 | 11/2012 | Chen et al. |
| 2012/0303412 | A1* | 11/2012 | Etzioni .................. G06Q 30/06 705/7.31 |
| 2012/0311637 | A1 | 12/2012 | Anthru et al. |
| 2013/0166350 | A1 | 6/2013 | Willemain et al. |
| 2014/0122401 | A1 | 5/2014 | Collica |
| 2014/0156346 | A1 | 6/2014 | Cai |
| 2014/0358828 | A1 | 12/2014 | Phillipps et al. |
| 2015/0019204 | A1 | 1/2015 | Simard et al. |
| 2015/0379072 | A1 | 12/2015 | Dirac et al. |
| 2015/0379429 | A1 | 12/2015 | Lee et al. |
| 2016/0078022 | A1 | 3/2016 | Lisuk et al. |
| 2016/0092519 | A1 | 3/2016 | Srivastava et al. |
| 2016/0171682 | A1 | 6/2016 | Abedini et al. |
| 2016/0260052 | A1 | 9/2016 | Ray et al. |
| 2016/0358099 | A1 | 12/2016 | Sturlaugson et al. |
| 2017/0061329 | A1 | 3/2017 | Kobayashi et al. |
| 2017/0270484 | A1 | 9/2017 | Cengiz et al. |
| 2017/0308976 | A1 | 10/2017 | Eidelman et al. |
| 2017/0315523 | A1 | 11/2017 | Cross et al. |
| 2018/0047071 | A1 | 2/2018 | Hsu et al. |
| 2018/0053116 | A1 | 2/2018 | Cai et al. |
| 2018/0240013 | A1 | 8/2018 | Strope et al. |
| 2018/0300576 | A1 | 10/2018 | Dalyac et al. |
| 2018/0308051 | A1* | 10/2018 | Nemati ................ G06Q 10/087 |
| 2018/0373208 | A1 | 12/2018 | Wee et al. |
| 2018/0374109 | A1* | 12/2018 | Scarpati ............. G06Q 30/0202 |
| 2019/0018823 | A1 | 1/2019 | Yabe et al. |
| 2019/0102693 | A1 | 4/2019 | Yates et al. |
| 2019/0108417 | A1 | 4/2019 | Talagala et al. |
| 2019/0130425 | A1* | 5/2019 | Lei ......................... G06N 20/00 |
| 2019/0147350 | A1 | 5/2019 | Bai et al. |
| 2019/0156357 | A1 | 5/2019 | Palinginis et al. |
| 2019/0156485 | A1 | 5/2019 | Pfeiffer |
| 2019/0228590 | A1 | 7/2019 | Kaifosh et al. |
| 2019/0250891 | A1 | 8/2019 | Kumar et al. |
| 2019/0272557 | A1* | 9/2019 | Smith .................. G06Q 10/087 |
| 2020/0005340 | A1* | 1/2020 | T. ......................... G06Q 10/087 |
| 2020/0042896 | A1 | 2/2020 | Ko et al. |
| 2020/0065424 | A1* | 2/2020 | Ananthapur Bache .. G06N 3/08 |
| 2020/0074402 | A1* | 3/2020 | Adato ............. G06Q 10/06315 |
| 2020/0090009 | A1 | 3/2020 | Arora et al. |
| 2020/0097709 | A1 | 3/2020 | Huang et al. |
| 2020/0098055 | A1 | 3/2020 | O'Hara et al. |
| 2020/0111109 | A1* | 4/2020 | Lei ........................... G06N 3/08 |
| 2020/0130425 | A1 | 4/2020 | Sorrentino et al. |
| 2020/0134641 | A1* | 4/2020 | Morgan ............. G06Q 30/0202 |
| 2020/0134642 | A1* | 4/2020 | Morgan ........... G06Q 10/06315 |
| 2020/0184494 | A1 | 6/2020 | Joseph et al. |
| 2020/0191594 | A1 | 6/2020 | Watanabe |
| 2020/0210920 | A1* | 7/2020 | Joseph .................. G06N 20/00 |
| 2020/0226504 | A1 | 7/2020 | Keng et al. |
| 2020/0250556 | A1 | 8/2020 | Nourian et al. |
| 2021/0110429 | A1 | 4/2021 | Keng et al. |

OTHER PUBLICATIONS

U.S. Appl. No. 16/599,143, Notice of Allowance dated Aug. 10, 2022.
U.S. Appl. No. 16/599,143, Advisory Action dated Jun. 9, 2022.
U.S. Appl. No. 16/599,143, Final Office Action dated Feb. 3, 2022.
U.S. Appl. No. 16/599,143, Non-Final Office Action dated Aug. 18, 2021.
U.S. Appl. No. 16/837,182, Final Office Action dated Apr. 27, 2022.
U.S. Appl. No. 16/837,182, Non-Final Office Action dated Sep. 16, 2021.
U.S. Appl. No. 17/993,952, Non-Final office Action dated Mar. 29, 2023.
U.S. Appl. No. 18/071,802, Non-Final Office Action dated Apr. 13, 2023.
Badam et al., "Time Fork: Interactive Prediction of Time Series, "CHI '16: Proceedings of the 2016 CHI Conference on Human Factors in Computing Systems May 2016, pp. 5409-5420.
Canadian Patent Application No. 3,154,982 Office Action dated Jun. 29, 2023.
Hu et al., "Identifying the "Ghost City" of Domain Topics in a Keyword Semantic Space Combining Citations," Scientometrics, 2018, vol. 114(3), 1141-1157.
International Patent Application No. PCT/CA2020/051379, International Preliminary Report on Patentability dated Jan. 5, 2022.
International Preliminary Report on Patentability from related PCT International Application No. PCT/CA2020/051378, dated Jan. 25, 2022, pp. 1-5.
International Search Report from related PCT International Application No. PCT/CA2020/051378, dated Dec. 16, 2020.
International Search Report from related PCT International Application No. PCT/CA2020/051379, dated Jan. 4, 2021.
Japanese Patent Application No. JP2022-521962, Office Action dated Oct. 21, 2022—English Translation available.
Runkler et al., "Generation of Linguistic Membership Functions from Word Vectors," IEEE International Conference on Fuzzy Systems, Jul. 2016, pp. 993-999.
Sherkat et al., "Interactive Document Clustering Revisited: A Visual Analytics Approach, "IUI2018: 23rdInternational Conference on Intelligent User Interfaces, Mar. 2018, pp. 281-292.
U.S. Appl. No. 16/697,620, Advisory Action dated Apr. 21, 2023.
U.S. Appl. No. 16/697,620, Final office action dated Feb. 9, 2023.
U.S. Appl. No. 16/697,620, Non-Final office Action dated Jul. 31, 2023.
U.S. Appl. No. 16/697,620, Office Action dated Apr. 29, 2022.
U.S. Appl. No. 16/697,620, Office Action dated Jul. 13, 2022.
U.S. Appl. No. 16/699,010, Final Office Action dated Apr. 24, 2023.
U.S. Appl. No. 16/848,266, Final Office Action dated Apr. 14, 2022.
U.S. Appl. No. 16/848,266, Non-Final Office Action dated Sep. 29, 2021.
U.S. Appl. No. 16/848,266, Notice of Allowance dated May 3, 2023.
U.S. Appl. No. 17/993,952, Final office action dated Aug. 3, 2023.
U.S. Appl. No. 18/071,802, Notice of Allowance dated Jul. 24, 2023.
U.S. Appl. No. 16/699,010, Advisory Action dated Jul. 14, 2023.
U.S. Appl. No. 16/699,010, Office Action dated Nov. 9, 2022.
U.S. Appl. No. 16/848,266, Non Final office Action dated Oct. 13, 2022.
Yoshizaki et al., "Machine Learning Usage Guide by Practical Learning ," Mynavi Publishing Corporation, Naoki Takiguchi, Sep. 20, 2019, vol. 1 (1), pp. 156-165.
Du, K.L., "Clustering: A Neural Network Approach," Neural Networks : The Official Journal of the International Neural Network Society, 2010, vol. 23 (1), pp. 89-107.
European Patent Application No. 20876015, Extended European Search Report dated Sep. 1, 2023.
PC Review Discussion Forum, "On Scatter Chart, How Can data Points be Moved with Curser?", Posts Dated Feb. 8, 2010, available at https://www.pcreview.co.uklthreads/on-scatter-chart-how-can-data-points-be-moved-with-curser.3965453/, accessed Sep. 11, 2023. 1 page. (Year: 2010).
U.S. Appl. No. 16/699,010, Non-Final office Action dated Sep. 18, 2023.
European Patent Application No. 20877770.6, Extended European Search Report dated Nov. 21, 2023.

\* cited by examiner

SYSTEMS AND METHODS FOR DYNAMIC DEMAND SENSING

CROSS-REFERENCE TO RELATED APPLICATIONS

This application is a continuation of U.S. patent application Ser. No. 16/599,143 filed Oct. 11, 2019, which is hereby incorporated by reference.

BACKGROUND

Both manufacturers and retailers depend on customer demand for their products. Yet there is a lack of inventory management approaches depending on predicted daily demand that is intuitive and interpretable. For example, there is little information on how the demand is influenced by various factors and how predicted demands will affect business metrics.

Given the voluminous amount of data within a supply chain, it is difficult to provide an accurate prediction of sales. Current solutions are referred to the industry concept of "demand sensing". The common metric reported for such solutions are based on the mean absolute percentage error (MAPE) of the predicted sales when compared against the actual sales. Most solutions do provide daily estimates of sales using various factors, but users aren't informed by the solutions in terms of the different impact those factors have on the predicted sales. The MAPE metric is used and reported but doesn't take into consideration the business impact of the modeling error and is unstable when it comes to low volume items.

Furthermore, any model that is used to forecast sales must consider constant changes to factors that affect sales of products. Such changes often vary geographically and temporally.

US 20140156346 discloses methods and systems for facilitating dynamic demand sensing. In some implementations, demand sensing data is received from a consumer device. The demand sensing data is generated while the consumer device is in-store. An information management system is updated with the demand sensing data. Analytics may then be performed on the demand sensing data to generate a demand report displayed at the information management system.

US 20120303411 discloses a system, method and computer program product for demand modeling and prediction in retail categories. The method uses time-series data comprising of unit prices and unit sales for a set of related products. This data is based on a number of reporting periods, and on a number of stores in a market geography. Other relevant data sets that affect retail demand are also used. A demand model for improved accuracy is achieved by: estimating a model for price movements and price dynamics from the time series data of unit-prices in the aggregated sales data; estimating a model for market share of each product in the retail category using the aggregated sales data and integrated additional product attribute data; and, estimating generating a model for an overall market demand in the retail category from the aggregated sales data.

The forecasting of sales must consider real-time changes in relevant factors, both from geographical and temporal perspectives. A forecasting method can be outdated even with a few weeks of its previous forecast, if it is not updated constantly to take into account information that impacts sales. A forecasting method that does not rely on the most up-to-date information, will not provide an accurate forecast. There is a need for developing a dynamic demand sensing system that forecasts demand on a daily basis at a granular level (e.g. single products at single locations).

BRIEF SUMMARY

In one aspect, there is provided: a computer-implemented method for forecasting sales of a product at a location, the method comprising: receiving, at an ingestion module, historical data associated with the product; processing, by the ingestion module, historical product data; providing processed historical product data to a machine learning storage device; fetching, by an external data module, historical location data associated with the location; processing, by the external data module, the historical location data; providing processed historical location data to the machine learning storage device; receiving, by a monitoring module, a request for a forecast of the sales of the product at the location; determining, by the monitoring module, a forecasting method to make the forecast; communicating to a forecasting module, by the monitoring module, instructions to execute the forecasting method; accessing, by the forecasting module, the processed historical product data; the processed historical location data; and one or more machine learning models from the machine learning storage device; engineering, by the forecasting module, one or more features associated with the processed historical product data and/or the processed historical location data; providing, by the forecasting module, the forecast based on the forecasting method; and uploading, to the machine learning storage, the forecast; wherein: the forecasting method comprises, in real-time, either: i) selecting a machine learning model to make the forecast; or ii) retraining a previously-selected machine learning model and using the retrained model to make the forecast; or iii) making the forecast based on the previously-selected model.

In some embodiments, the request for the forecast is a first request; the forecasting module selects the machine learning model to make the forecast, selecting comprising: training a plurality of machine learning models on a first portion of a data set; validating the machine learning model on a second portion of the data set; and retraining the machine learning model on a sum of the first portion and the second portion, the data set comprising a sum total of the processed historical product data and the processed historical location data.

In some embodiments, the request for the forecast is not a first request; a new category of processed data has been added to the machine learning storage since a most recent forecast, the new category of processed data comprising at least one of a new category of processed historical product data and a new category of processed historical location data; and the forecasting module selects the machine learning model to make the forecast, selecting the machine learning model comprising: training a plurality of machine learning models on a first portion of an expanded data set, the expanded data set comprising the new category of processed data, the processed historical product data and the processed historical location data; validating the machine learning model on a second portion of the expanded data set; and retraining the machine learning model on a sum total of the first portion and the second portion.

In some embodiments, the request for the forecast is not a first request; an additional amount of processed data has been added to the machine learning storage since a most recent forecast, the additional amount of processed data comprising at least one of new processed historical product data and new processed historical location data; the additional amount of processed data exceeds a threshold; and the forecasting module selects the machine learning model to make the forecast; selecting the machine learning model comprising: training a plurality of machine learning models on a first portion of an expanded data set, the expanded data set comprising the additional amount of processed data, the processed historical product data and the processed historical location data; validating the machine learning model on a second portion of the expanded data set; and retraining the machine learning model on a sum of the first portion and the second portion. In some embodiments, the request for the forecast the threshold is at least 15% to 30% of an amount of processed data used by the forecasting module for making the most recent forecast.

In some embodiments, the request for the forecast is not a first request, and the method further comprises: evaluating, by the monitoring module, a forecast accuracy of the forecast against incoming processed historical product data; and instructing the machine learning module, by the monitoring module, to select the machine learning model if the forecast accuracy falls below a threshold, selecting the machine learning model comprising: training a plurality of machine learning models on a first portion of an expanded data set, the expanded data set comprising the incoming processed historical product data, the processed historical product data and the processed historical location data; validating the machine learning model on a second portion of the expanded data set; and retraining the machine learning model on a sum total of the first portion and the second portion. In some embodiments, the forecast accuracy is based on any one of: a Mean Absolute Percentage Error (MAPE); a Mean Absolute Scaled Error (MASE), a Mean Absolute Error (MAE), and a Weighted Mean Absolute Percentage Error (WMAPE).

In some embodiments, the request for the forecast is not a first request; and the method further comprises: evaluating, by the monitor module, a time interval between a most recent forecast and the request; and instructing the forecast module, by the monitor module, to retrain the previously-selected machine learning model if the time interval exceeds a threshold, retraining comprising retraining the previously-selected machine learning model on an expanded data set comprising the processed historical product data, the processed historical location data and new processed data collected during the time interval. In some embodiments, the threshold is between 2 to 8 months.

In another aspect, there is provided a non-transitory computer-readable storage medium, the computer-readable storage medium including instructions that when executed by a computer, cause the computer to: receive, at an ingestion module, historical data associated with a product; process, by the ingestion module, historical product data; provide processed historical product data to a machine learning storage device; fetch, by an external data module, historical location data associated with a location; process, by the external data module, the historical location data; provide the processed historical location data to the machine learning storage device; receive, by a monitoring module, a request for a forecast of sales of the product at the location; determine, by the monitoring module, a forecasting method to make the forecast; communicate to a forecasting module, by the monitoring module, instructions to execute the forecasting method; access, by the forecasting module, the processed historical product data; the processed historical location data; and one or more machine learning models from the machine learning storage device; engineer, by the forecasting module, one or more features associated with the processed historical product data and/or the processed historical location data; execute, by the forecasting module, the forecasting method; provide, by the forecasting module, the forecast based on the forecasting method; and upload, to the machine learning storage, the forecast; wherein when executing the forecasting method, the instructions cause the computer to either: i) select a machine learning model to make the forecast; or ii) retrain a previously-selected machine model and use the retrained model to make the forecast; or iii) make the forecast based on the previously-selected model.

In some embodiments, the request for the forecast is a first request; the forecasting module selects the machine learning model to make the forecast; and the instructions, when executed by the computer, cause the computer to: train a plurality of machine learning models on a first portion of a data set; validate the machine learning model on a second portion of the data set; and retrain the machine learning model on a sum of the first portion and the second portion, the data set comprising a sum total of the processed historical product data and the processed historical location data.

In some embodiments, the request for the forecast is not a first request; a new category of processed data has been added to the machine learn storage since a most recent forecast, the new category of processed data comprising at least one of a new category of processed historical product data and a new category of processed historical location data; the forecasting module selects the machine learning model to make the forecast; and the instructions, when executed by the computer, cause the computer to: train a plurality of machine learning models on a first portion of an expanded data set, the expanded data set comprising the new category of processed data, the processed historical product data and the processed historical location data; validate the machine learning model on a second portion of the expanded data set; and retrain the machine learning model on a sum total of the first portion and the second portion.

In some embodiments, the request for the forecast is not a first request; an additional amount of processed data has been added to the machine learn storage since a most recent forecast, the additional amount of processed data comprising at least one of new processed historical product data and new processed historical location data; the additional amount of processed data exceeds a threshold; the forecasting module selects the machine learning model to make the forecast; and the instructions, when executed by the computer, cause the computer to: train a plurality of machine learning models on a first portion of an expanded data set, the expanded data set comprising the additional amount of processed data, the processed historical product data and the processed historical location data; validate the machine learning model on a second portion of the expanded data set; and retrain the machine learning model on a sum of the first portion and the second portion. In some embodiments, the threshold is at least 15% to 30% of an amount of processed data used by the forecasting module for making the most recent forecast.

In some embodiments, the request for the forecast is not a first request; and the instructions, when executed by the computer, further cause the computer to: evaluate, by the monitoring module, a forecast accuracy of the forecast against incoming processed historical product data; and instruct the machine learning module, by the monitoring module, to select the machine learning model if the forecast accuracy falls below a threshold; and the instructions, when executed by the computer, cause the computer to: train a plurality of machine learning models on a first portion of an expanded data set, the expanded data set comprising the incoming processed historical product data, the processed historical product data and the processed historical location data; validate the machine learning model on a second portion of the expanded data set; and retrain the machine learning model on a sum total of the first portion and the second portion. In some embodiments, the forecast accuracy is based on any one of: a Mean Absolute Percentage Error (MAPE); a Mean Absolute Scaled Error (MASE), a Mean Absolute Error (MAE), and a Weighted Mean Absolute Percentage Error (WMAPE).

In some embodiments, the request for the forecast is not a first request; and the instructions, when executed by the computer, further cause the computer to: evaluate, by the monitor module, a time interval between a most recent forecast and the request; and instruct the forecast module, by the monitor module, to retrain the previously-selected machine learning model if the time interval exceeds a threshold, retraining comprising retraining the previously-selected machine learning model on an expanded data set comprising the processed historical product data, the processed historical location data and new processed data collected during the time interval. In some embodiments, the threshold is between 2 to 8 months.

In yet another aspect, there is provided a computing system comprising: a processor; and a memory storing instructions that, when executed by the processor, configure the system to: receive, at an ingestion module, historical data associated with a product; process, by the ingestion module, historical product data; provide processed historical product data to a machine learning storage device; fetch, by an external data module, historical location data with the location; process, by the external data module, the historical location data; provide processed historical location data to the machine learning storage device; receive, by a monitoring module, a request for a forecast of the sales of the product at the location; determine, by the monitoring module, a forecasting method to make the forecast; communicate to a forecasting module, by the monitoring module, a command to execute the forecasting method; access, by the forecasting module, the processed historical product data; the processed historical location data; and one or more machine learning models from the machine learning storage device; engineer, by the forecasting module, one or more features associated with the processed historical product data and/or the processed historical location data; provide, by the forecasting module, the forecast based on the forecasting method; and upload, to the machine learning storage, the forecast; wherein when executing the forecasting method, the instructions configure the system to either: i) select a machine learning model to make the forecast; or ii) retrain a previously-selected machine model and use the retrained model to make the forecast; or iii) make the forecast based on the previously-selected model.

In some embodiments, the request for the forecast is a first request; the forecasting module selects the machine learning model to make the forecast; and the instructions, when executed by the processor, configure the system to: train a plurality of machine learning models on a first portion of a data set; validate the machine learning model on a second portion of the data set; and retrain the machine learning model on a sum of the first portion and the second portion, the data set comprising a sum total of the processed historical product data and the processed historical location data.

In some embodiments, the request for the forecast is not a first request; a new category of processed data has been added to the machine learn storage since a most recent forecast, the new category of processed data comprising at least one of a new category of processed historical product data and a new category of processed historical location data; the forecasting module selects the machine learning model to make the forecast; and the instructions, when executed by the processor, configure the system to: train a plurality of machine learning models on a first portion of an expanded data set, the expanded data set comprising the new category of processed data, the processed historical product data and the processed historical location data; validate the machine learning model on a second portion of the expanded data set; and retrain the machine learning model on a sum total of the first portion and the second portion.

In some embodiments, the request for the forecast is not a first request; an additional amount of processed data has been added to the machine learn storage since a most recent forecast, the additional amount of processed data comprising at least one of new processed historical product data and new processed historical location data; the additional amount of processed data exceeds a threshold; the forecasting module selects the machine learning model to make the forecast; and the instructions, when executed by the processor, configure the system to: train a plurality of machine learning models on a first portion of an expanded data set, the expanded data set comprising the additional amount of processed data, the processed historical product data and the processed historical location data; validate the machine learning model on a second portion of the expanded data set; and retrain the machine learning model on a sum of the first portion and the second portion. In some embodiments, the threshold is at least 15% to 30% of an amount of processed data used by the forecasting module for making the most recent forecast In some embodiments, the request for the forecast is not a first request; and the instructions, when executed by the processor, further configure the system to: evaluate, by the monitoring module, a forecast accuracy of the forecast against incoming processed historical product data; instruct the machine learning module, by the monitoring module, to select the machine learning model if the forecast accuracy falls below a threshold; and the instructions, when executed by the processor, configure the system to: train a plurality of machine learning models on a first portion of an expanded data set, the expanded data set comprising the incoming processed historical product data, the processed historical product data and the processed historical location data; validate the machine learning model on a second portion of the expanded data set; and retrain the machine learning model on a sum total of the first portion and the second portion. In some embodiments, the forecast accuracy is based on any one of: a Mean Absolute Percentage Error (MAPE); a Mean Absolute Scaled Error (MASE), a Mean Absolute Error (MAE), and a Weighted Mean Absolute Percentage Error (WMAPE).

In some embodiments, the request for the forecast is not a first request; and the method further comprises Evaluate, by the monitor module, a time interval between a most recent forecast and the request; and instruct the forecast module, by the monitor module, to retrain the previously-selected machine learning model if the time interval exceeds a threshold, retraining comprising retraining the previously-selected machine learning model on an expanded data set comprising the processed historical product data, the processed historical location data and new processed data collected during the time interval. In some embodiments, the threshold is between 2 to 8 months.

There is provided an approach to demand sensing which includes a number of advantageous features. In addition to providing accurate forecasting, based on changing conditions, there is provided interpretability of the demand model in terms of factors; evaluation of the model in terms of key performance indicators; and use of inventory simulations for the evaluation procedure.

The details of one or more embodiments of the subject matter of this specification are set forth in the accompanying drawings and the description below. Other features, aspects, and advantages of the subject matter will become apparent from the description, the drawings, and the claims.

Like reference numbers and designations in the various drawings indicate like elements.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
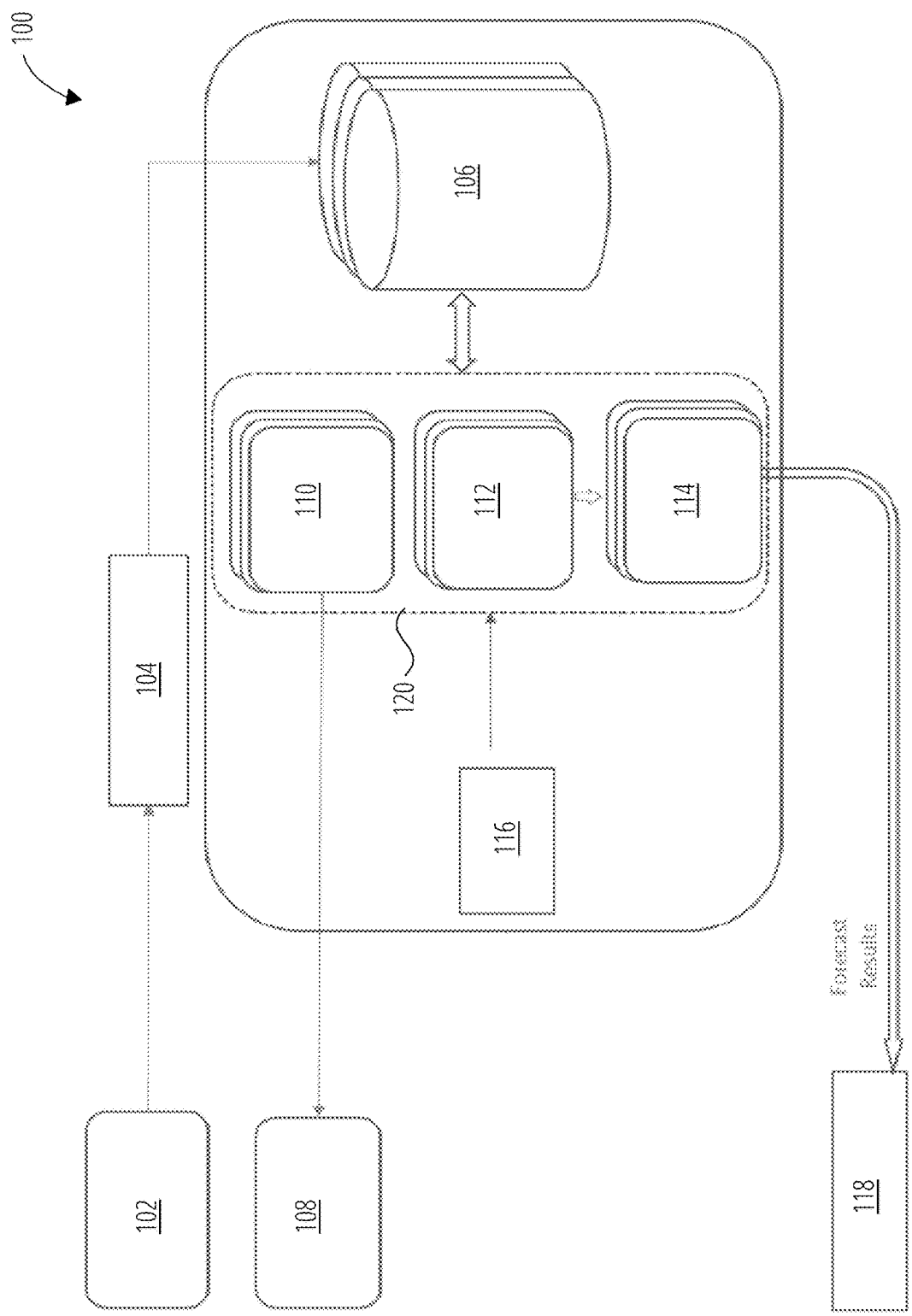
FIG. 1 illustrates a system architecture in accordance with one embodiment.

The demand sensing method can provide predicted daily sales for a single products (for example, according to their stock keeping unit (SKU) identification codes) for single locations (e.g. retail stores) over some horizon (e.g. 13 weeks ahead) for a variety of purposes, including: allowance by the user to use the predictions to drive replenishment orders at the defined locations; and gaining an analytical understanding of the factors driving the predicted sales in order to plan for the future.

The data processing services are composed of various components of a machine learning pipeline. Per user request, features may be generated from the raw user-specific and public datasets. Then one or more quantile regression models can be trained with these features. Selection of features and hyperparameters can be achieved through the evaluation of each model on the same validation set. The evaluation comprises managing a simulated inventory for the period of time equivalent to the validation set, where orders are given based on simple heuristics and key performance metrics are measured, such as excessive inventory over a period of time and number of stock out days. Once a model is chosen (for best performance for an item and store combination), the contribution of each feature (on the demand predictions) may be evaluated through model interpretation techniques (e.g. SHapley Additive exPlantions). In a last step, data related to predictions, prediction quality, and prediction contributions may be gathered and illustrated to the user by a number of interactive visualizations that are found in user-application interfaces mentioned above.

Historical data may be collected from a variety of sources. For example, data may be collected from a client/user that includes historical plus forwarding looking data such as campaigns. In some embodiments, historical client data can include point-of-sales data that provides information on the amount of product sold at a particular day at a particular location; and inventory of a particular product at a particular location. Other types of data can be mined from the web and social media, such as weather data, financial markets, and the like. Calendar data that includes local holidays, along with local event data may also be collected. Promotion campaign details for a particular product at a particular location can also be included, and other relevant events. In summary, any information that relates to, or impacts upon, the sales of a particular product at a particular location, can be used as part of the input dataset.

The raw data is first processed, before being used by machine learning models. In some embodiments, that can entail features generation (which is fed into the various models of the Machine Learning Module).

In some embodiments, the data is partitioned into a training portion and a validation portion. Each model may be trained on the training portion. Each trained model is then tested on the remaining validation portion of the data, and the model that provides the best prediction on the validation portion of the data, is selected. The selected machine learning model can be retrained on the entire data set, and then used for deployment on live data.

In some embodiments, the data is partitioned into a training portion, a validation portion and a testing portion. Each model may be trained on the training portion. Each trained model is then tested on the validation portion of the data, and the model that provides the best prediction on the validation portion of the data, is selected. The selected machine learning model can be retrained on the first two portions (i.e. data from both the training and validation portions). It can then be tested on the testing portion to provide a measure of accuracy for the user. The selected model may then be used for deployment on live data.

The machine learning models are trained and validated on data pertaining to a particular product at a particular location, in order to provide forecasting for that product at that location. Forecasting by the selected trained model can be for a selected time frame. In some embodiments, that time frame is a 13-week horizon. The "live" input data used for forecasting can include sales data from a previous time period (e.g. sales from 1 month, or 2 months, or 3 months ago, or more); promotion campaigns, weather data for the location and in the vicinity of the location, market indexes for the location and in the vicinity of the location; and events at or in the vicinity of the location.

FIG. 1 illustrates a system architecture 100 in accordance with one embodiment.

Client data source 102 provides a variety of raw data from the user, including, but not limited to: point of sales data that indicates the sales record of all of the client's products at every location; the inventory history of all of the client's products at every location; promotional campaign details for all products at all locations, and events that are important/relevant for sales of a client's product at every location.

Ingestion module 104 receives client data source 102 and converts it into a different format that is ready for storage in ML storage 106.

Dynamic demand sensing module 120 comprises three modules: external data module 110; monitor module 112 and forecasting module 114, each of which is described below.

External data module 110 obtains external data from external data source(s) 108 and prepares it for storage in ML storage 106. External data can be mined from the web and social media, and can include information such as weather data, financial market data, and the like for a plurality of locations. These locations can include locations that are important to the client's product sales. Furthermore, market indicines may be wider than the actual location(s) required by the client, as market indices are often nation-wide, whereas locations can be confined to smaller geographical areas such as cities or towns. Calendar data that includes local holidays, along with local event data can also be included. In some embodiments, external data module 110 can be on a schedule to obtain external data from external data source(s) 108 (e.g. on a daily, semi-daily, weekly, bi-weekly, monthly, etc. schedule). External data module 110 can access different types of data, each on its own schedule. For example, weather data can be accessed on a daily basis; market data can be accessed daily or weekly, calendar data can be accessed yearly, etc.

Request module 116 provides a request to the monitor module 112, to provide a forecast for a subset of the data stored in ML storage 106. In some embodiments, request module 116 may request the forecasting of a particular product at a particular store (or location) for a forecasting horizon time period.

Monitor module 112 obtains information provided by request module 116 as to which subset of products/stores are to be forecasted. Based on information related to the subset and information related to the ML storage 106, the monitor module 112 decides on how the subset will be forecast, based on a set of rules, described below. Once the subset is ready for forecasting, forecasting module 114 provides a forecast that is output to output 118.

Figure 2:
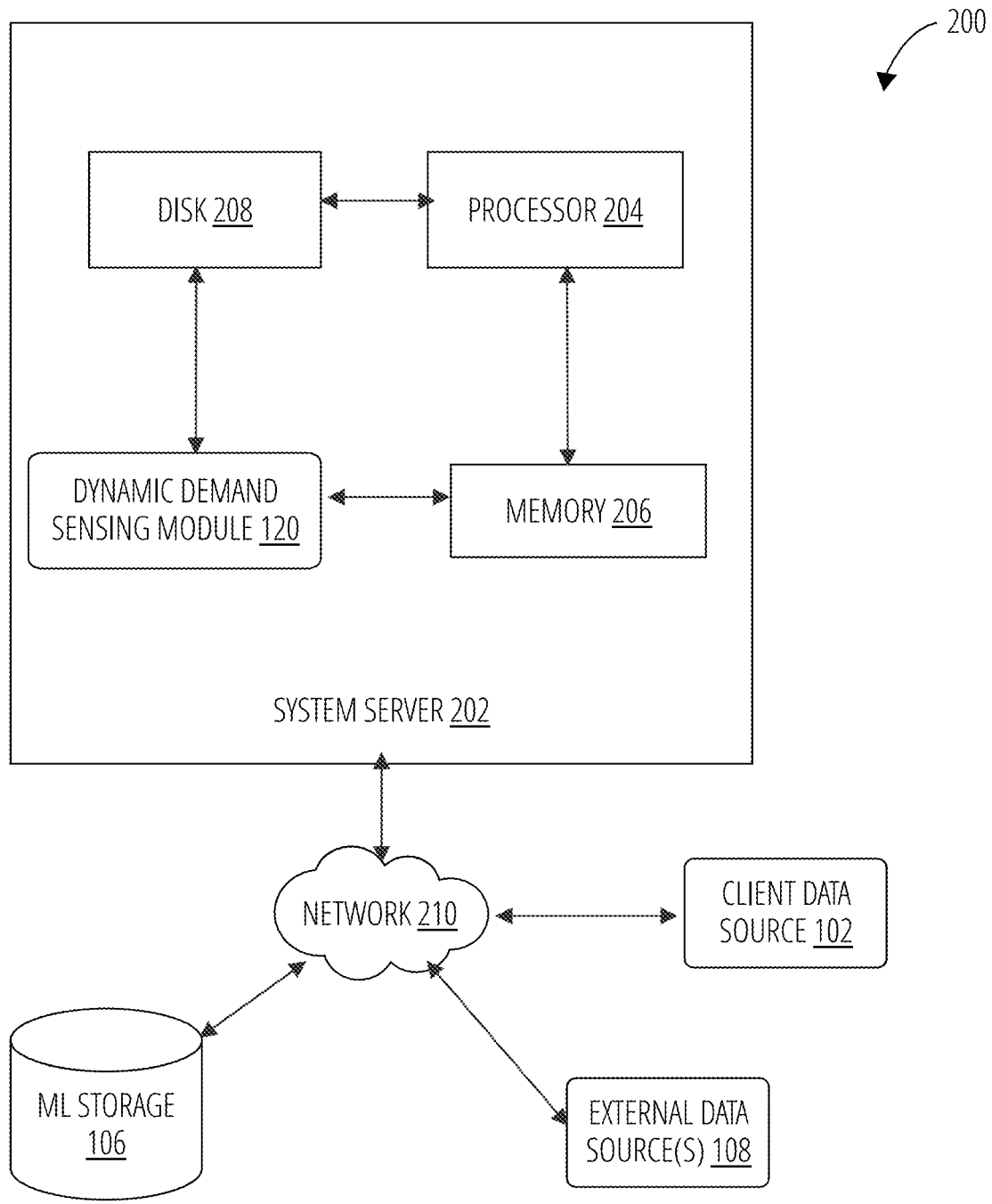
FIG. 2 illustrates a block diagram in accordance with one embodiment.

FIG. 2 illustrates a system 200 in accordance with one embodiment of a dynamic demand sensing system.

System 200 includes a system server 202, ML storage 106, client data source 102 and external data source(s) 108. System server 202 can include a memory 206, a disk 208, a processor 204 and a dynamic demand sensing module 120. While one processor 204 is shown, the system server 202 can comprise one or more processors. In some embodiments, memory 206 can be volatile memory, compared with disk 208 which can be non-volatile memory. In some embodiments, system server 202 can communicate with ML storage 106, external data source(s) 108 and client data source 102 via network 210. While ML storage 106 is illustrated as separate from system server 202, ML storage 106 can also be integrated into system server 202, either as a separate component within system server 202, or as part of at least one of memory 206 and disk 208.

System 200 can also include additional features and/or functionality. For example, system 200 can also include additional storage (removable and/or non-removable) including, but not limited to, magnetic or optical disks or tape. Such additional storage is illustrated in FIG. 2 by memory 206 and disk 208. Storage media can include volatile and nonvolatile, removable and non-removable media implemented in any method or technology for storage of information such as computer-readable instructions, data structures, program modules or other data. Memory 206 and disk 208 are examples of non-transitory computer-readable storage media. Non-transitory computer-readable media also includes, but is not limited to, Random Access Memory (RAM), Read-Only Memory (ROM), Electrically Erasable Programmable Read-Only Memory (EEPROM), flash memory and/or other memory technology, Compact Disc Read-Only Memory (CD-ROM), digital versatile discs (DVD), and/or other optical storage, magnetic cassettes, magnetic tape, magnetic disk storage or other magnetic storage devices, and/or any other medium which can be used to store the desired information and which can be accessed by system 200. Any such non-transitory computer-readable storage media can be part of system 200. Communication between system server 202, client data source 102, ML storage 106 and external data source(s) 108 via network 210 can be over various network types. Non-limiting example network types can include Fibre Channel, small computer system interface (SCSI), Bluetooth, Ethernet, Wi-fi, Infrared Data Association (IrDA), Local area networks (LAN), Wireless Local area networks (WLAN), wide area networks (WAN) such as the Internet, serial, and universal serial bus (USB). Generally, communication between various components of system 200 may take place over hard-wired, cellular, Wi-Fi or Bluetooth networked components or the like. In some embodiments, one or more electronic devices of system 200 may include cloud-based features, such as cloud-based memory storage.

ML storage 106 may implement an "in-memory" database, in which volatile (e.g., non-disk-based) storage (e.g., Random Access Memory) is used both for cache memory and for storing the full database during operation, and persistent storage (e.g., one or more fixed disks) is used for offline persistency and maintenance of database snapshots. Alternatively, volatile storage may be used as cache memory for storing recently-used data, while persistent storage stores the full database.

ML storage 106 may store metadata regarding the structure, relationships and meaning of data. This information may include data defining the schema of database tables stored within the data. A database table schema may specify the name of the database table, columns of the database table, the data type associated with each column, and other information associated with the database table. ML storage 106 may also or alternatively support multi-tenancy by providing multiple logical database systems which are programmatically isolated from one another. Moreover, the data may be indexed and/or selectively replicated in an index to allow fast searching and retrieval thereof. In addition, ML storage 106 can store a number of machine learning models that are accessed by the dynamic demand sensing module 120. A number of ML models, such as gradient-boosted trees, ensemble of trees and support vector regression, can be used.

External data source(s) 108 may include sources that provide both historical and real-time information about climate, weather, financial indexes, web data, social media data, local holidays, festivals and events, and the like. Commercial weather and financial services can be purchased or accessed by other means.

Client data source 102 may provide a variety of raw data from the user, including, but not limited to: point of sales data that indicates the sales record of all of the client's products at every location; the inventory history of all of the client's products at every location; promotional campaign details for all products at all locations, and events that are important/relevant for sales of a client's product at every location.

Using network 210, system server 202 can retrieve data from ML storage 106, 102 and external data source(s) 108. The retrieved data can be saved in memory 206 or disk 208. In some cases, system server 202 can also comprise a web server, and can format resources into a format suitable to be displayed on a web browser.

Figure 3:
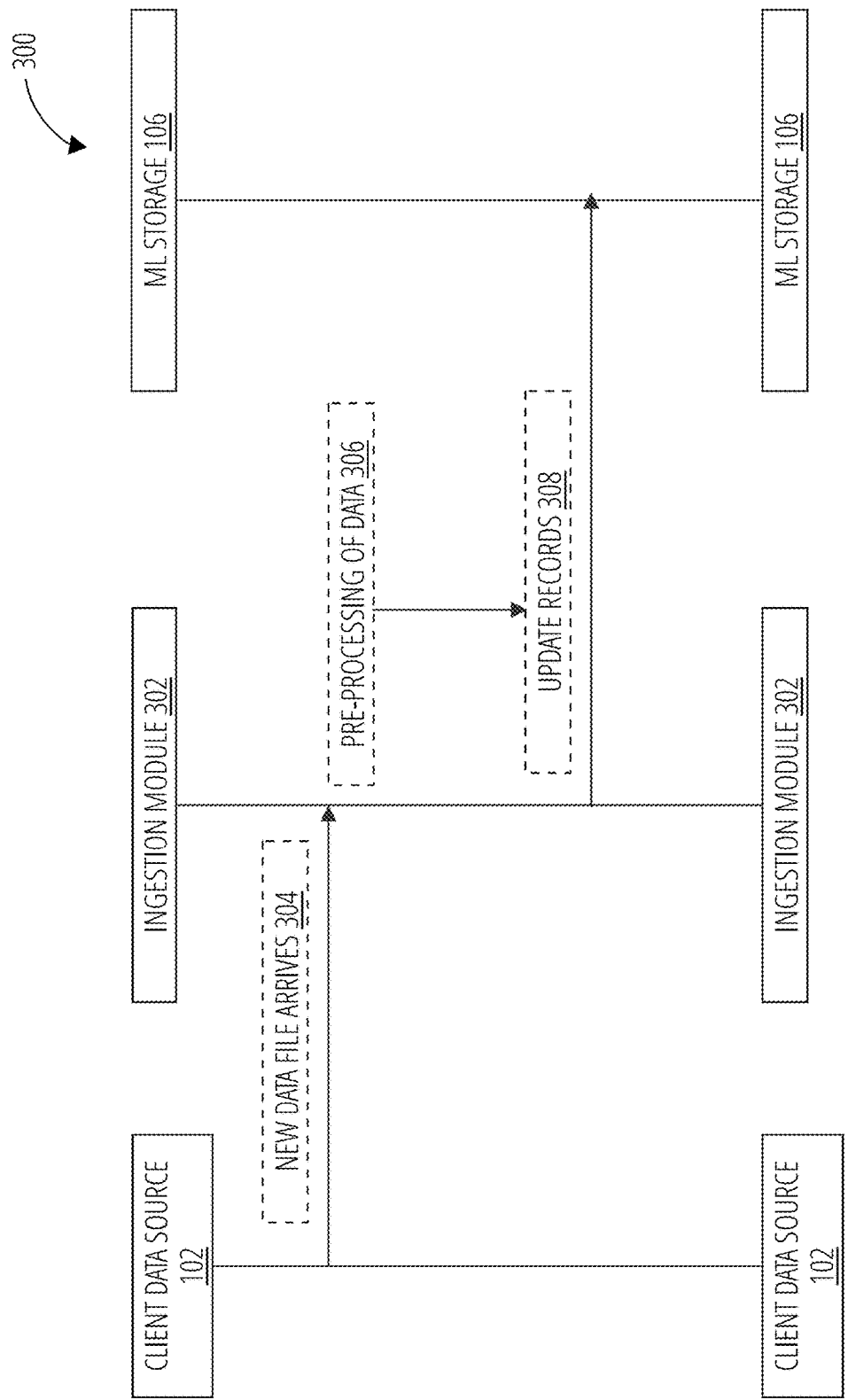
FIG. 3 illustrates a flowchart for an ingestion module in accordance with one embodiment.

FIG. 3 illustrates a flowchart 300 for an ingestion module 302 in accordance with one embodiment.

Ingestion module 302 receives data from client data source 102 at block 304, and proceeds to pre-process the data at block 306. Pre-processing may include transformation, validation, remediation, or any combination thereof, of the data.

Validation of the data simple means to determine whether there are potential errors in the incoming data. For example, validation can include identification of missing data, null data, differences in row counts and data mismatches. In some embodiments, data validation module may use a machine learning algorithm in conjunction with a z-score threshold value to identify anomalous data values.

Data remediation involves remediation or re-calculation of data that is indicative of an error. For example: missing or erroneous values may be replaced using data that is interpolated from an existing value or values, an average of existing data or a mean of existing data. In some embodiments, remediation of data can use a predictive model to replace data that is indicative of error.

Figure 4:
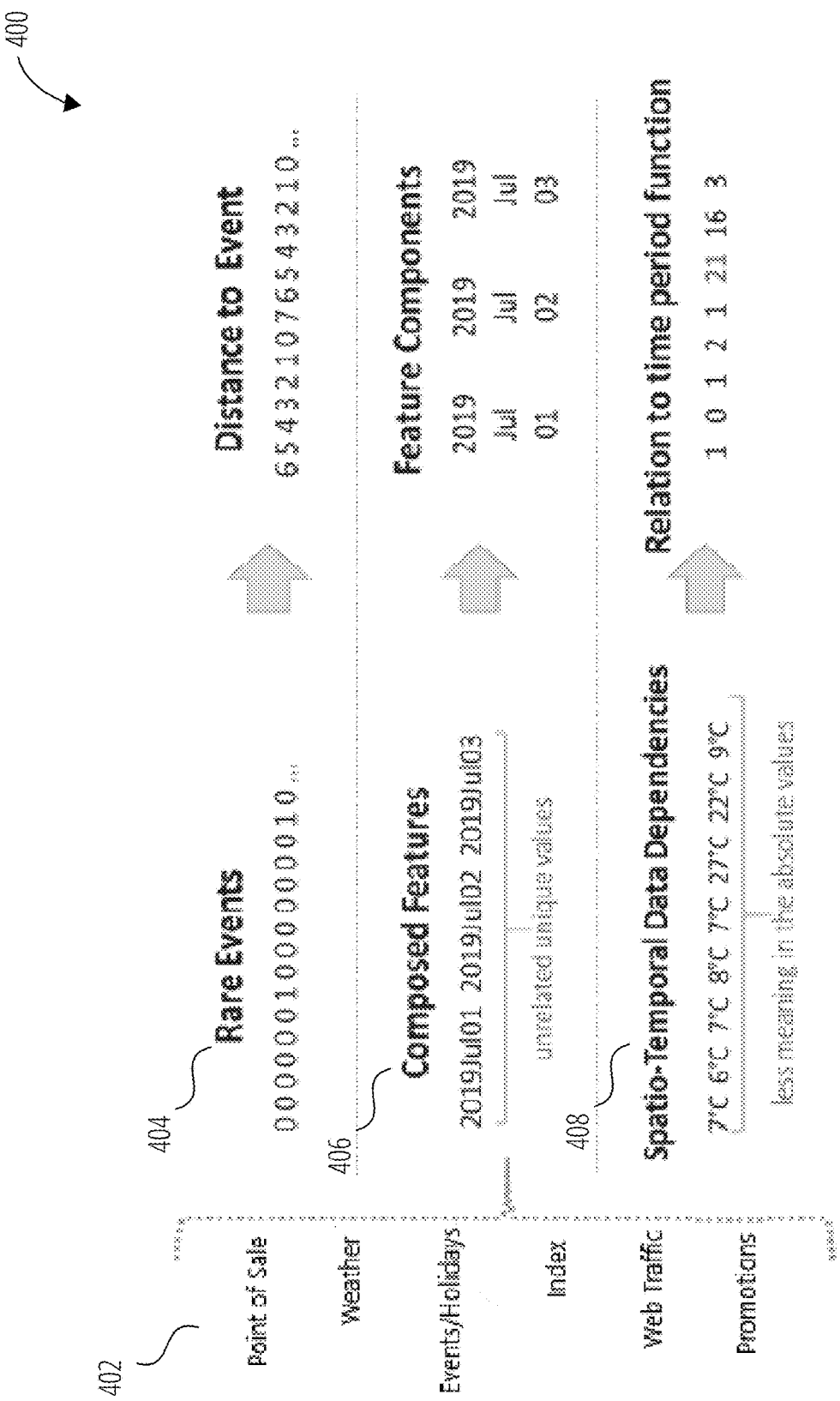
FIG. 4 illustrates transformation examples in accordance with one embodiment.

Transformation examples are illustrated in FIG. 4 and described below.

The pre-processed data is used to update data at block 308, for storage in the ML storage 106.

FIG. 4 illustrates transformation examples 400 in accordance with one embodiment. Examples of features 402 can include data related to: point of sales, weather, events/holidays, market index, web traffic and promotions. Features 402 may include additional categories of data, fewer, or different categories than those shown in FIG. 4.

Example 1 404, shows how data related to a rare event, which is in binary form, is transformed to a form that includes integers, by specifying the number of days to the event. For example, the rare event can have the value '0' to indicate the day a store is open (e.g. Mon-Sat) and '1' to indicate the day a store is closed (e.g. Sunday). The series of '0's and '1's is transformed, instead, to a series of integers that indicate how many days away that a given day is to the rare event.

Example 2 406 shows an example of transforming consecutive dates to a tabular form that lists year (in one row); month (in a second row) and date (in the third row).

Example 3 408 shows an example of transforming temperature values on certain dates, to temperature values in relation to the lowest temperature reading (6° C.). The original 6° C. reading is transformed to '0'; 7° C. to '1'; 8° C. to '2', and so forth. Graphical representations of transformations are discussed below.

Figure 5:
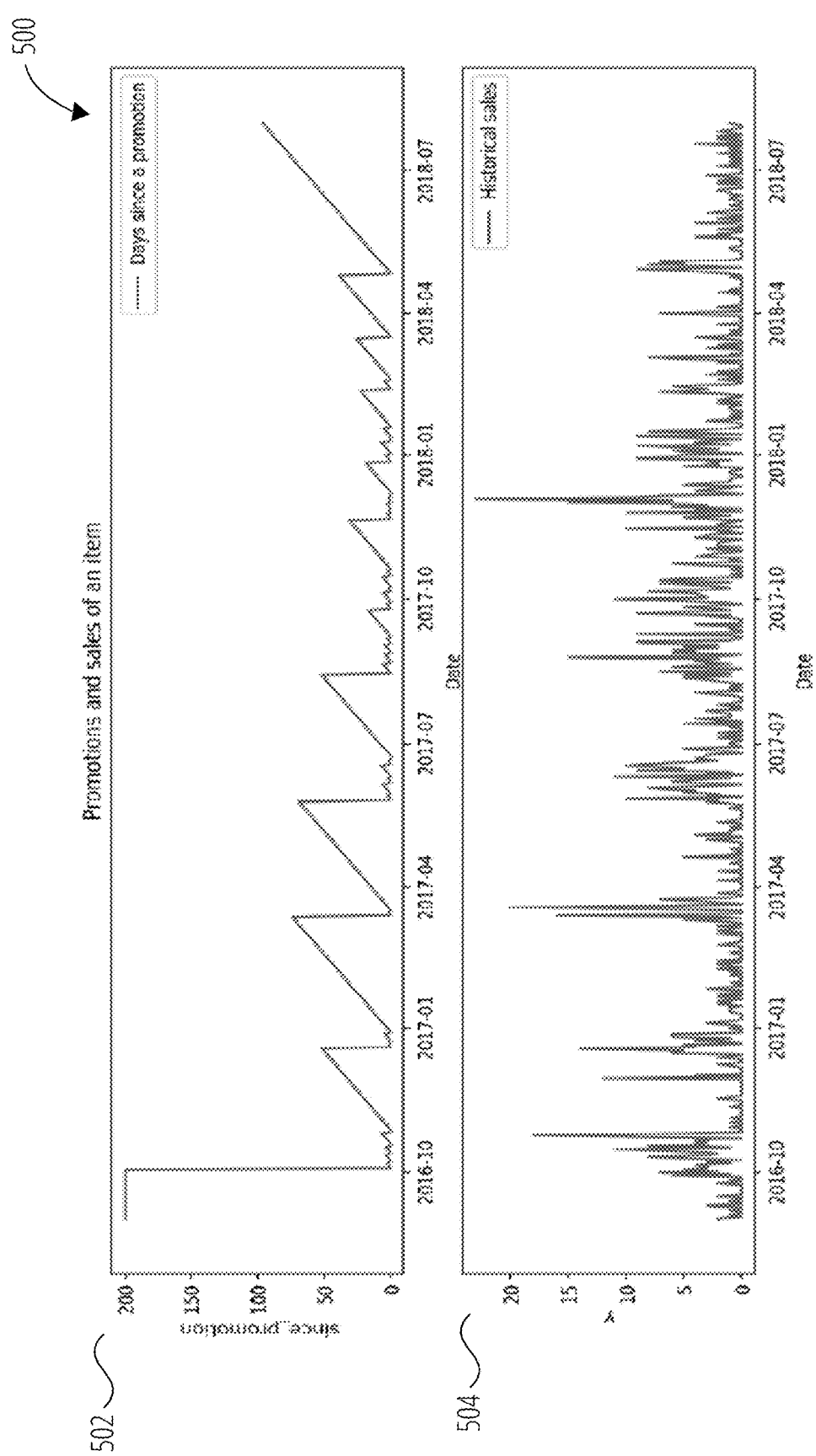
FIG. 5 illustrates transformation examples in accordance with one embodiment.

FIG. 5 illustrates further transformation examples 500 in accordance with one embodiment.

Promotion transformation 502 can be graphically represented as the number of days after a promotion. Rather than the actual day of the promotion. For comparison, sales of an item 504 is shown next to sales promotion transformation 502. Preliminary analysis shows that there was a spike in sales shortly after a promotion in October 2016 and April 2017.

Figure 6:
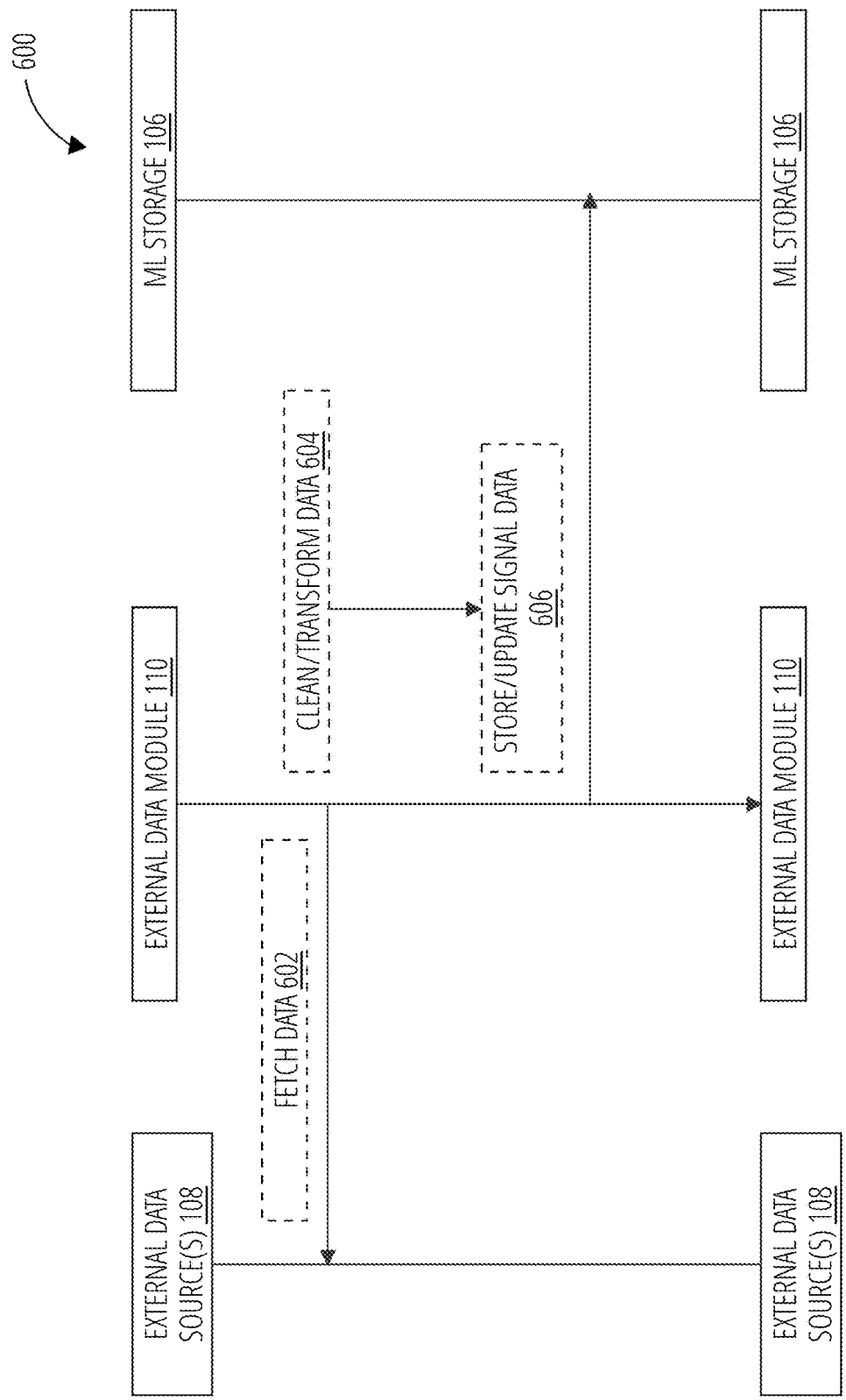
FIG. 6 illustrates a flowchart for an external data module in accordance with one embodiment.

FIG. 6 illustrates a flowchart 600 for an external data module 110 in accordance with one embodiment.

External data module 110 fetches data (at block 602) from external data source(s) 108 which can include raw data about weather, market indices, trends, etc. The external data source(s) 108 provide data that complements client data source 102 (of FIG. 1). The raw data is cleaned (or validated) to remove outliers, and transformed (at block 604) for storage, at block 606, in the ML storage 106.

Pre-processing may include transformation, validation, remediation, or any combination thereof, of the data.

Validation of the data simple means to determine whether there are potential errors in the incoming data. For example, validation can include identification of missing data, null data, differences in row counts and data mismatches. In some embodiments, data validation module may use a machine learning algorithm in conjunction with a z-score threshold value to identify anomalous data values.

Data remediation involves remediation or re-calculation of data that is indicative of an error. For example: missing or erroneous values may be replaced using data that is interpolated from an existing value or values, an average of existing data or a mean of existing data. In some embodiments, remediation of data can use a predictive model to replace data that is indicative of error.

Examples of transformation of external data are discussed with reference to FIG. 7.

The pre-processed external data is used to update data at block 308, for storage in the ML storage 106.

Figure 7:
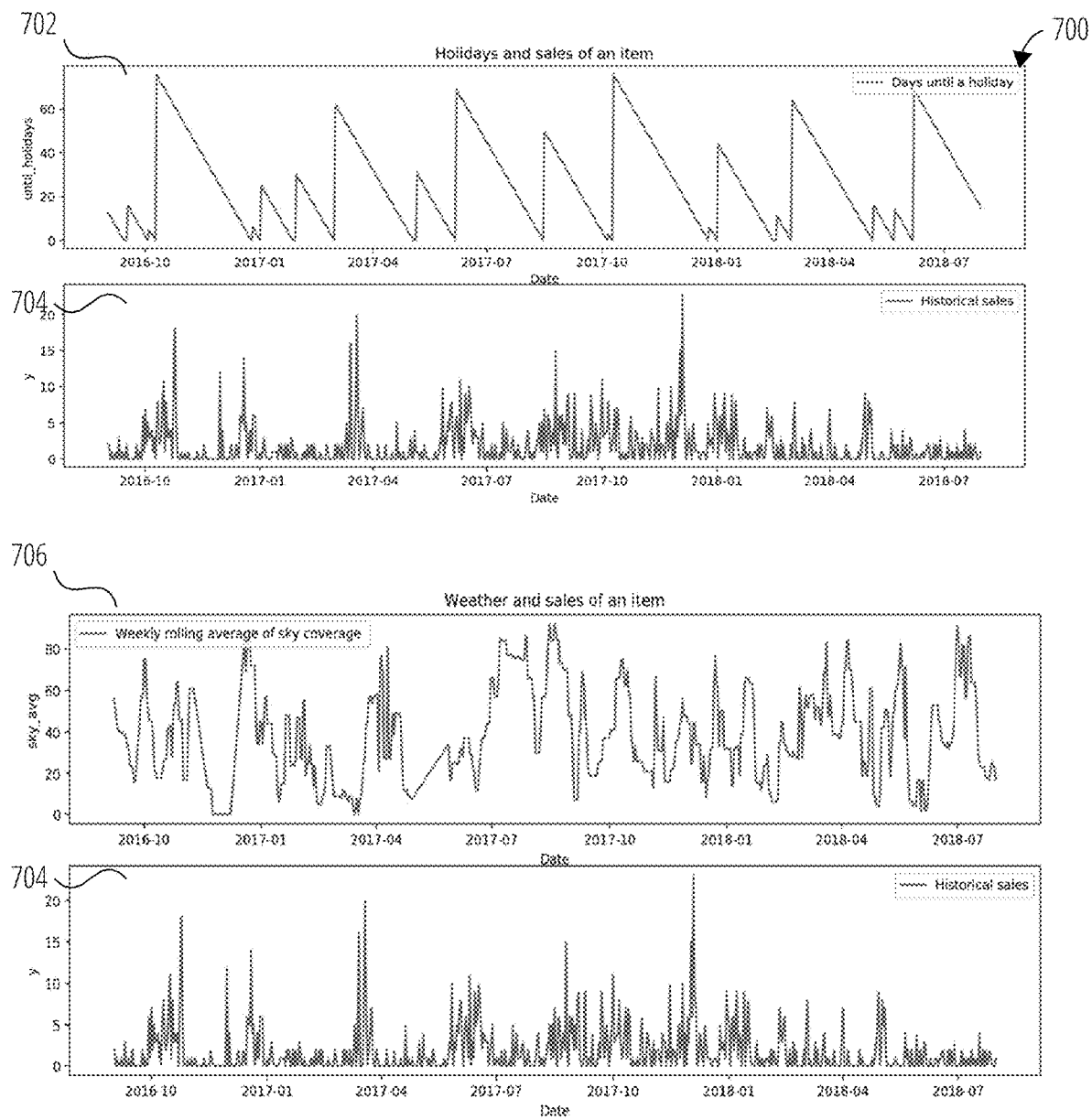
FIG. 7 illustrates a transformation examples in accordance with one embodiment.

FIG. 7 illustrates further transformation examples 700 of external data in accordance with one embodiment.

Examples of external data include calendar dates, such as holidays, and weather data.

Holidays transformation 702 can be graphically represented as the number of days until a holiday, rather than the actual day of the holiday. For comparison, sales of an item 704 is shown next to holidays transformation 702. Preliminary analysis suggests that there was a spike in sales shortly after a holiday in October 2016 and April 2017.

Weather transformation 706 can be graphically represented as a weekly rolling average of sky coverage over an area where the item is sold. For comparison, sales of an item 704 is shown next to weather transformation 706.

Figure 8:
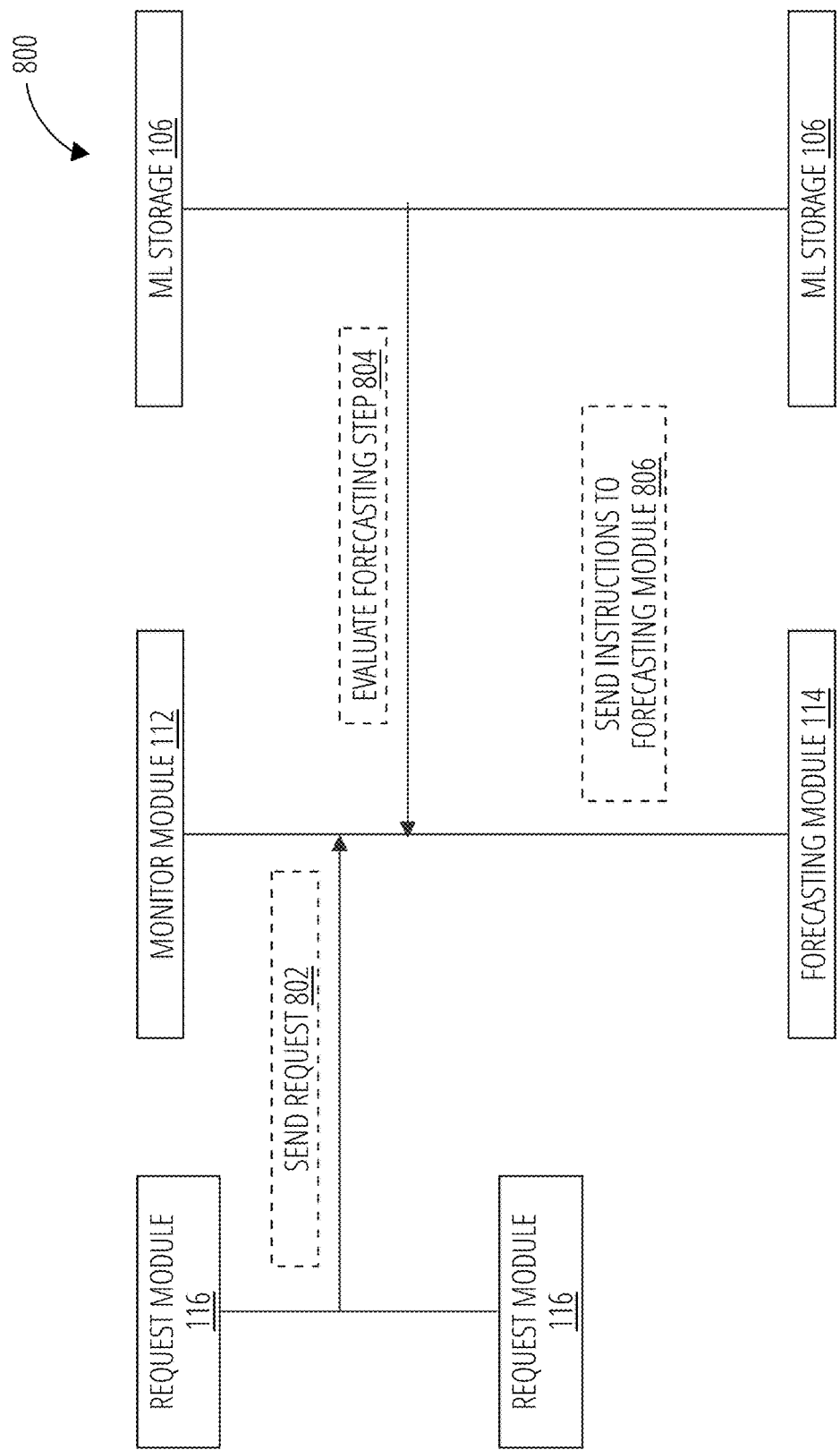
FIG. 8 illustrates a flowchart for a monitor module in accordance with one embodiment.

FIG. 8 illustrates a flowchart 800 for a monitor module 112 in accordance with one embodiment.

Monitor module 112 receives a request for a forecast (at block 802) from request module 116. Based on the specific information associated with the request, monitor module 112 evaluates the forecasting step (at block 804) based on the data and machine learning metrics, all stored in ML storage 106. Details of this evaluation are described below. Once the forecasting step is evaluated, instructions are sent to the forecasting module 114 (at block 806).

Figure 9:
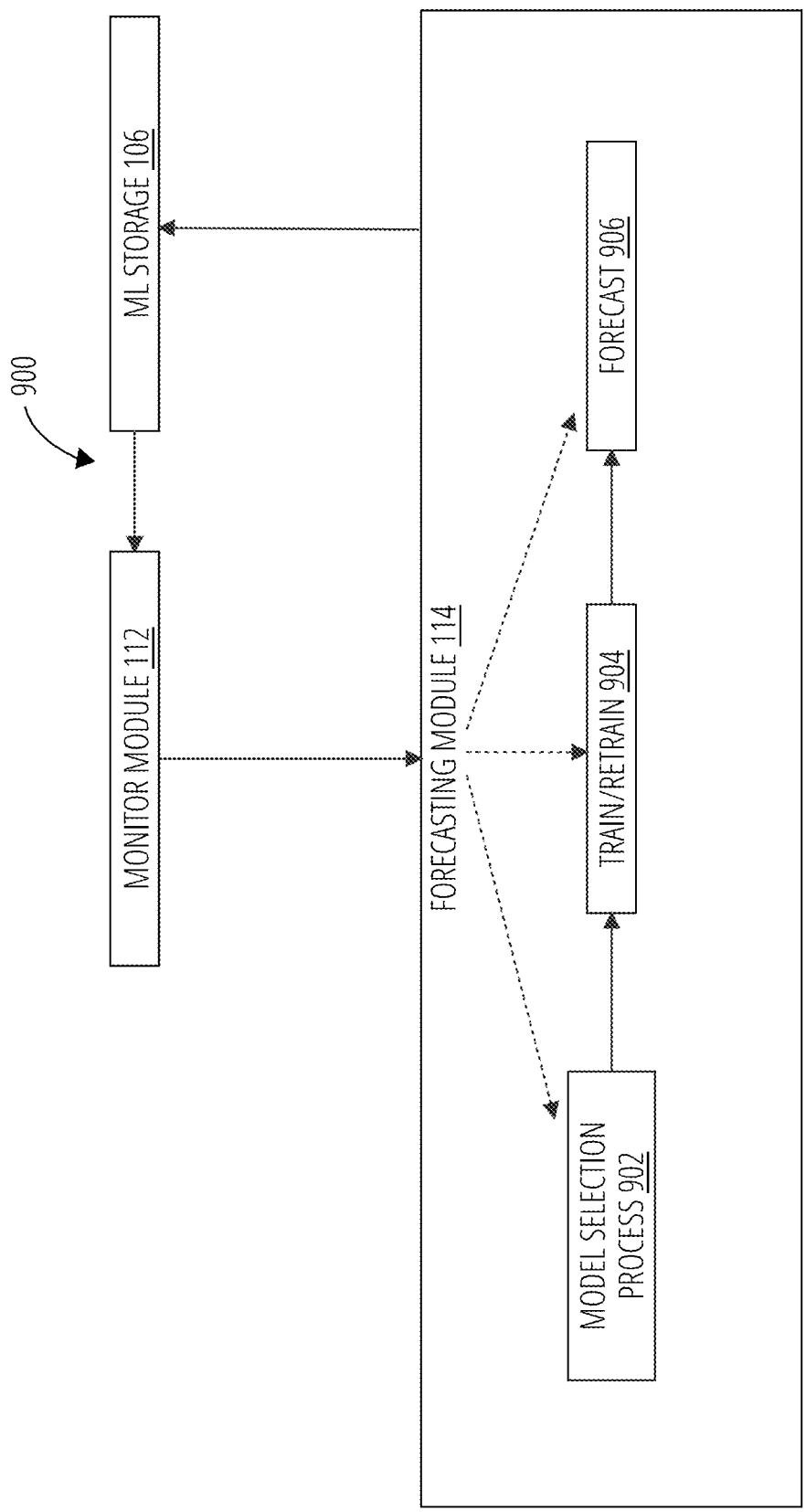
FIG. 9 illustrates a flowchart for a forecasting module in accordance with one embodiment.

FIG. 9 illustrates a flowchart 900 for a forecasting module in accordance with one embodiment.

Monitor module 112 evaluates a forecast request from request module 116, in view of data and machine learning model metrics stored in ML storage 106. Instructions are sent to the forecasting module 114 to initiate one of three task sequences. A first task sequence comprises: forecasting module 114 will select a machine learning model at block 902, followed by training the selected model at block 904, followed by forecasting with the trained model at block 906, for a specified future period of time.

A second, different task sequence comprises: training a selected model at block 904, followed by forecasting with the trained model at block 906, for a specified future period of time.

A third, different task sequence simply comprises forecasting with a selected, trained model at block 906, for a specified future period of time.

All results produced by forecasting module 114 are stored in ML storage 106. In some embodiments, this includes the selected, trained model and all of the features and hyperparameters associated thereof, along with the forecast results.

Since ML storage 106 is updated dynamically with external data and user data, the forecast results produced by forecasting module 114 can be evaluated by comparing with actual updated data. In some embodiments, the evaluation of forecasted results is performed by monitor module 112 and used as part of the evaluating the forecasting step (block 804) in FIG. 8.

Figure 10:
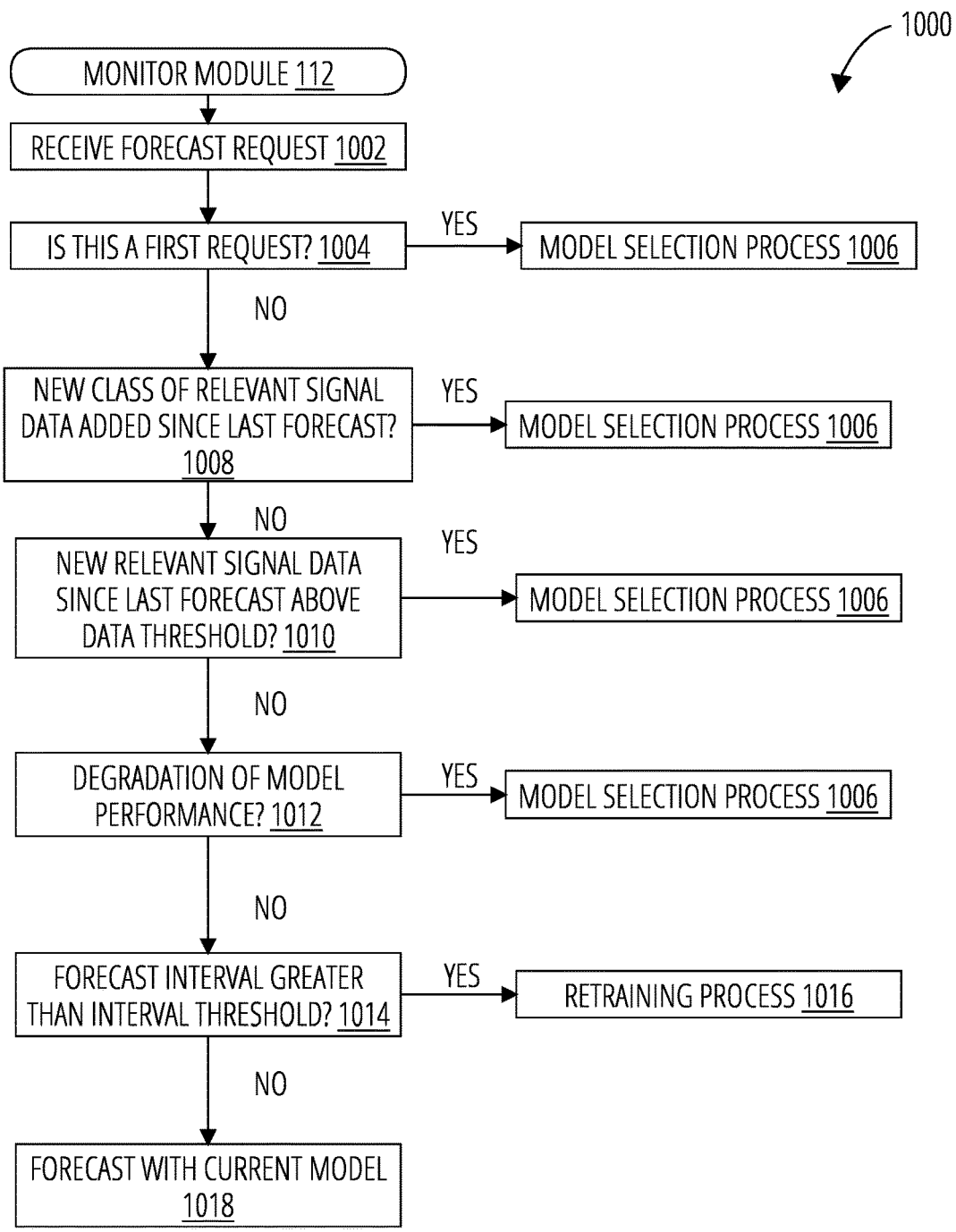
FIG. 10 illustrates a flowchart of a forecast request evaluation by a monitor module in accordance with one embodiment.

FIG. 10 illustrates a flowchart of a forecast request evaluation by a monitor module 112 in accordance with one embodiment.

Monitor module 112 receives a request for a forecast at block 1002. For example, this can be a request to forecast the demand of a certain client product at a particular location over a specific time period. As an example, this may be a request to forecast the demand of a particular make of a vacuum cleaner at a specific retail store in Kanata, Ontario, for a period of 13 weeks.

Monitor module 112 checks with the ML storage 106 to see if this is first time a forecasting request for this particular product and location is made, at block 1004. If it is, then monitor module 112 flags the request to undergo a full model selection process at block 1006, which is subsequently sent to forecasting module 114 (see FIG. 9). Embodiments of the full model selection process are described below.

If this is not the first time a forecasting request for this particular product and location is made, then monitor module 112 checks the ML storage 106 to see if any new class of relevant signal data has been added since the last forecast request for the particular product and location, at block 1008. If the answer is yes, then monitor module 112 flags the request to undergo a full model selection process at block 1006, which is subsequently sent to forecasting module 114 (see FIG. 9).

As an example, in the intervening period between the first request and the subsequent request, ML storage 106 may have received weather data that includes a humidity index relevant to the location of the request, which was not present in the data used for the initial forecast. The humidity index is a new class of signal data that can be used in the machine learning forecasting of the particular product at the particular location. Note that if new humidity data has been received during the intervening period, but the new humidity data has no impact on the location of interest, then it is not considered as being relevant. For example, if ML storage 106 receives the humidity index for Washington, D.C., but not for Kanata ON (where the forecast is requested), then this is not considered as a relevant new class of signal data.

If the answer at block 1008 is no, monitor module 112 checks to see if the amount of new relevant data stored in ML storage 106 since the last forecast, is above a certain threshold at block 1010. If yes, then monitor module 112 flags the request to undergo a full model selection process at block 1006, which is subsequently sent to forecasting module 114 (see FIG. 9). Again, a comparison is made with regards to data that is relevant to the forecasting request in question.

As an example, ML storage 106 receives user data and external data on an ongoing basis. During an intervening period between forecast requests, the amount of new signal data accumulates, and can be quantified such that the amount of new data is a percentage of the amount of data used for the previous forecast. In some embodiments, the minimum threshold may be 15% to 30%, or 15% or 20% or 25% or 30%, of the amount of data used for the previous forecast.

If the answer at block 1010 is no, monitor module 112 proceeds to block 1012 to evaluate the performance of the machine learning model used in the previous forecast. With reference to FIG. 9, once the forecasting module 114 provides a forecast, the forecast is stored in the ML storage 106. Monitor module 112 evaluates the forecast on an ongoing basis by comparing the forecasted values with the actual values as the latter are uploaded to ML storage 106 on an ongoing basis. Evaluation methods known in the art may be used to evaluate the accuracy of the forecasted values, and a criterion may be selected to determine whether or not the forecast remains viable. In some embodiments, the evaluation method can be selected from mean absolute percentage error (MAPE); mean absolute scaled error (MASE), mean absolute error (MAE), and Weighted Mean Absolute Percentage Error (WMAPE). If the forecast is not deemed viable, then monitor module 112 flags the request to undergo a full model selection process at block 1006, which is subsequently sent to forecasting module 114 (see FIG. 9).

If the answer at block 1012 is no, monitor module 112 proceeds to block 1012 to evaluate the time interval between the previous and current forecasting requests at block 1014. If the time interval is beyond a certain threshold, then monitor module 112 flags the request to have the current model retrained at block 1010, which is subsequently sent to forecasting module 114 (see FIG. 9). The time interval threshold may be any value. In some embodiments, the time threshold value may be a few months or more. In some embodiments, the time threshold may be 2 to 8 months, or 3 to 6 months, or 2 months, or 3 months, or 6 months. Retraining of the selected model may comprise retraining on the initial data set along with the data that has accumulated in the intervening time period.

If the time threshold is surpassed, all of the signal data gathered from the user and external data sources during the intervening period between successive forecasting requests is used to retrain the current model. Embodiments of retraining are described below.

If the time threshold is not surpassed, monitor module 112 proceeds to instruct forecasting module 114 to forecast using the current model at block 1018, without any retraining.

Figure 11:
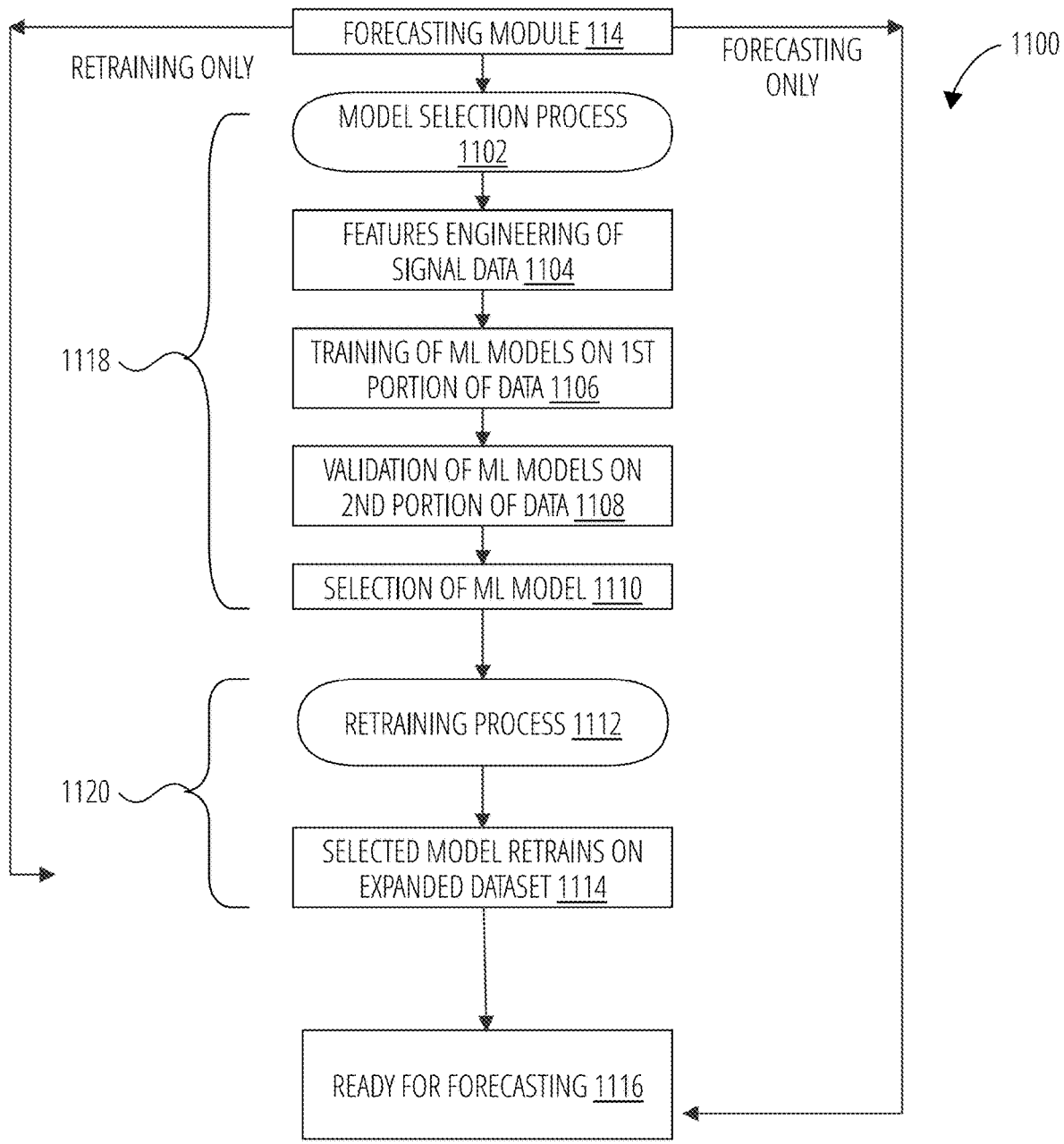
FIG. 11 illustrates a flow chart of a forecasting module in accordance with one embodiment.

FIG. 11 illustrates a flow chart 1100 of a forecasting module 114 in accordance with one embodiment.

Forecasting module 114 receives instructions from monitor module 112, as shown in FIG. 9, to either select a model (block 902), train/retrain (block 904), or forecast (block 906). In FIG. 11, block series 1118 describes a flowchart of the model selection process 1102 in an embodiment; block series 1120 describes a flowchart of the training process 1112 in an embodiment, and block 1116 refers to the forecasting of the trained ML model.

When forecasting module 114 is instructed to conduct a model selection process 1102 by monitor module 112, a first step is to engineer features of signal data (retrieved from ML storage 106) at step block 1104. Features engineering may be automated in the sense that the system can generate features more amenable to machine learning without having a user define one or more transformations of the features engineering process. In some embodiments, selection of transformations may be achieved automatically through methods like cross-validation, dimensionality reduction and independence criteria tests.

The timeframe of signals data used at block 1104 varies, depending on where in flowchart 1000 (of FIG. 10) the model selection process occurs. For example, if the model selection process is selected at block 1006 (i.e. performing a forecast for the first time), then all of the relevant signal data (from the user and external data sources) collected up to the time of receiving the first forecast request, is used. For example, if the model selection process is selected at block 1006 (i.e. performing a subsequent forecast), then all of the relevant signal data (from the user and external data sources) collected up to the time of receiving the subsequent request, is used.

Once the features engineering data is prepared, it is used to train, validate and optionally test. In some embodiments, the engineered data is divided chronologically into two portions: a training portion and a validation portion. Forecasting module 114 obtains access to a plurality of ML models in ML storage 106; each of the ML models is trained on the training portion at block 1106. Each trained ML model then provides a prediction for the time period corresponding to the validation portion at block 1108. Each forecast is evaluated for accuracy, and the most accurate model is selected for further forecasting at block 1110.

In some embodiments, the training portion may be between 50%-80% of the full engineered dataset; the validation portion may be between 20%-50%%, such that the overall total is 100%. In some embodiments, the training/validation portions may be 60%/40%%, or 80%/20% or 70%/30%. Different validation schemes, known in the art, may be used. Examples include nested cross-validation comprising an outer loop and inner loop (for tuning hyperparameters). As an example, validation may be performed over many windows of the training data, rather than one single window.

Retraining of a selected ML model is described in block series 1120, in accordance with one embodiment. A selected ML model is first retrained on an expanded dataset at block 1114. Details of the training/retraining vary slightly, depending on where in the overall process of FIG. 10 the selected model is being trained—within a model selection process (i.e. in block 1006); or within a retraining process alone (i.e. Block 1016).

Where retraining of the selected ML model is part of a model selection process 1102, the selected ML model is retrained on an expanded engineered data set comprising data corresponding to the training and validation portions of the dataset (at block 1114).

Where retraining of the selected ML model occurs without model selection process 1102 (i.e. retraining only), the selected ML model is retrained on an expanded engineered data set comprising data corresponding to the training and validation portions of the dataset (at block 1114).

Figure 12:
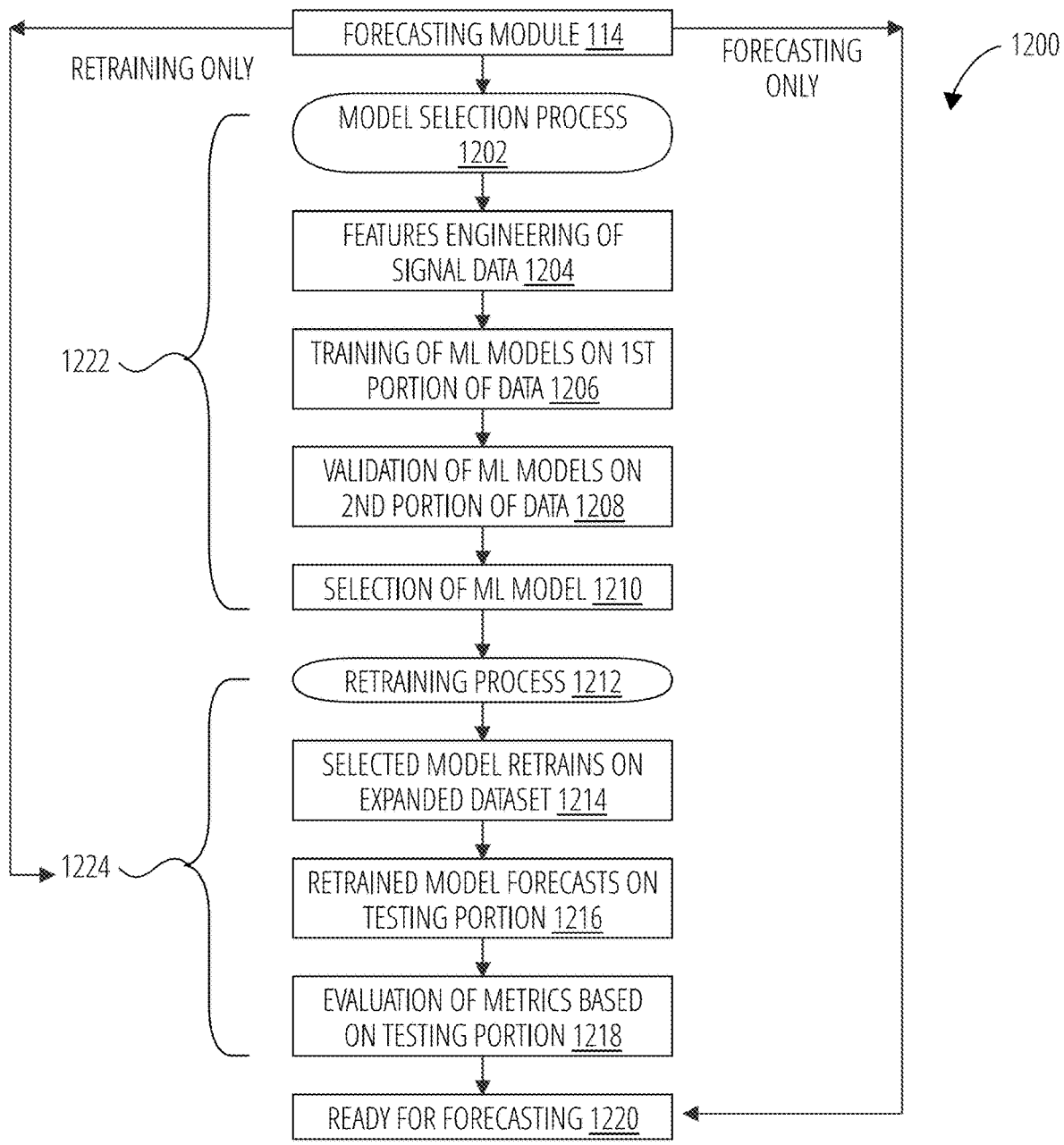
FIG. 12 illustrates a flow chart of a forecasting module in accordance with one embodiment.

FIG. 12 illustrates a flow chart 1200 of a forecasting module 114 in accordance with one embodiment.

Forecasting module 114 receives instructions from monitor module 112, as shown in FIG. 9, to either select a model (block 902), train/retrain (block 904), or forecast (block 906). In FIG. 12, block series 1222 describes a flowchart of the model selection process 1202 in an embodiment; block series 1224 describes a flowchart of the training process 1212 in an embodiment, and block 1220 refers to the forecasting of the trained ML model.

When forecasting module 114 is instructed to conduct a model selection process 1202 by monitor module 112, a first step is to engineer features of signal data (retrieved from ML storage 106) at step block 1204. Features engineering may be automated in the sense that the system can generate features more amenable to machine learning without having a user define one or more transformations of the features engineering process. In some embodiments, selection of transformations may be achieved automatically through methods like cross-validation, dimensionality reduction and independence criteria tests.

The timeframe of signals data used at block 1204 varies, depending on where in flowchart 1000 (of FIG. 10) the model selection process occurs. For example, if the model selection process is selected at block 1006 (i.e. performing a forecast for the first time), then all of the relevant signal data (from the user and external data sources) collected up to the time of receiving the first forecast request, is used. For example, if the model selection process is selected at block 1006 or ML storage 106 (i.e. performing a subsequent forecast), then all of the relevant signal data (from the user and external data sources) collected up to the time of receiving the subsequent request, is used.

Once the features engineering data is prepared, it is used to train, validate and test. In some embodiments, the engineered data is divided chronologically into three portions: a training portion, a validation portion and a test portion. Forecasting module 114 obtains access to a variety of ML models in ML storage 106; each of the ML models is trained on the training portion at block 1206. Each trained ML model then provides a prediction for the time period corresponding to the validation portion at block 1208. Each forecast is evaluated for accuracy, and the most accurate model is selected for further forecasting at block 1210.

In some embodiments, the training portion may be between 50%-80% of the full engineered dataset; the validation portion may be between 10%-25%, and the testing portion between 5%-25%, such that the overall total is 100%. In some embodiments, the training/validation/testing portions are 60%/20%/20%. In some embodiments, the amount of data in the testing portion may be too large for timely execution, in which case, an absolute time frame of data is chosen. As an example, this may be between the last 0-20 weeks of data, or about the last 15 weeks of data, while increasing the size of the training and/or validation portion. Other validation schemes, known in the art, may be used. Examples include nested cross-validation comprising an outer loop and inner loop (for tuning hyperparameters). As an example, validation may be performed over many windows of the training data, rather than one single window.

Retraining of a selected ML model is described in block series 1224, in accordance with one embodiment. A selected ML model is first retrained on an expanded dataset at block 1214; it then makes a forecast corresponding to the period of a testing portion at block 1216, and its accuracy is evaluated, based on its performance in the testing portion, at block 1218. Details of the training/retraining vary slightly, depending on where in the overall process of FIG. 10, the selected model is being trained—within a model selection process (i.e. in block 1006, block 1006, ML storage 106 or 618); or within a retraining process alone (i.e. Block 1006).

Where retraining of the selected ML model is part of a model selection process 1202, the selected ML model is retrained on an expanded engineered data set comprising data corresponding to the training and validation portions of the dataset (at block 1214). It then forecasts predictions corresponding to the time period of the testing portion at block 1216, and its accuracy evaluated at block 1218.

Where retraining of the selected ML model occurs without model selection process 1202 (i.e. retraining only), the selected ML model is retrained on an expanded engineered data set comprising data corresponding to the training and validation portions of the dataset (at block 1214). It then forecasts predictions corresponding to the time period of the testing portion at block 1216, and its accuracy evaluated at block 1218.

Accuracy evaluation of the selected ML model, at block 1218, may be performed by a number of techniques know in the art. For example, error measures such as Mean Absolute Error (MAE) or Mean Absolute Scaled Error (MASE) can be used as an evaluation of accuracy. Accuracy evaluation allows a user to have an idea of demand predictability of a particular product at a particular location for a specified time period.

Example

A client requests a 13-week forecast for demand of a particular product at its only store in Kanata, Ontario. The user provides historical data related to the sales of the product at its Kanata location, in the form of point-of-sales data, inventory, promotional information, and the like to ingestion module 104 (of FIG. 1) which pre-processes the data and stores it in ML storage 106. In addition, the user provides data related to the sales of the product at the Kanata location on an ongoing basis, such that the ML storage 106 is updated on an ongoing basis.

External data related to the product sales in Kanata is obtained by external data module 110 from external data source(s) 108. Such external data includes historical weather data for Kanata and the surrounding region, holidays and events throughout the year for Kanata, market indexes for the province of Ontario (in which Kanata is located) and Canada, along with other financial data related to Kanata. The external data is also pre-processed and stored in ML storage 106. As with user data, the external data is updated on an ongoing basis.

The monitor module 112 receives the forecast request from request module 116 and determines whether or not this request is the first request for the particular product at its Kanata store. If it is the first request of its kind, monitor module 112 flags the forecast request for a model selection process by forecasting module 114. On the other hand, it this is a subsequent forecast request, monitor module 112 proceeds through the flowchart shown in FIG. 10, and flags the forecast request to the forecasting module 114 if necessary, or simply instructs the forecasting module 114 to forecast the demand for the next 13 weeks.

Where the forecasting request is the first of its kind, forecasting module 114 conducts a model selection process in which all historical data relevant to the particular product at the Kanata store is queried from the ML storage 106. Forecasting module 114 then generates features (for both external data and user-supplied data) and merged with demand data (the target for the forecast—data already supplied by user). A training and validation set are created from the whole historical set and various methods are applied to find the best configuration of features and models, where each configuration is compared and the best one according to a metric of choice (e.g. MAE, MASE, etc.) is picked. This configuration (e.g. features and hyperparameters) is saved to the datastore and the selected model is trained on a larger training set and its performance is measured on a testing set that corresponds to the most recent data acquired about the product sales at the Kanata store. The ML model and its performance are also stored in ML storage 106.

Then a forecast is computed with the trained model for a period of 13 weeks ahead. In addition, explanations of each point of the forecast are computed according to the features used by the model and what they entailed for each prediction.

Figure 13:
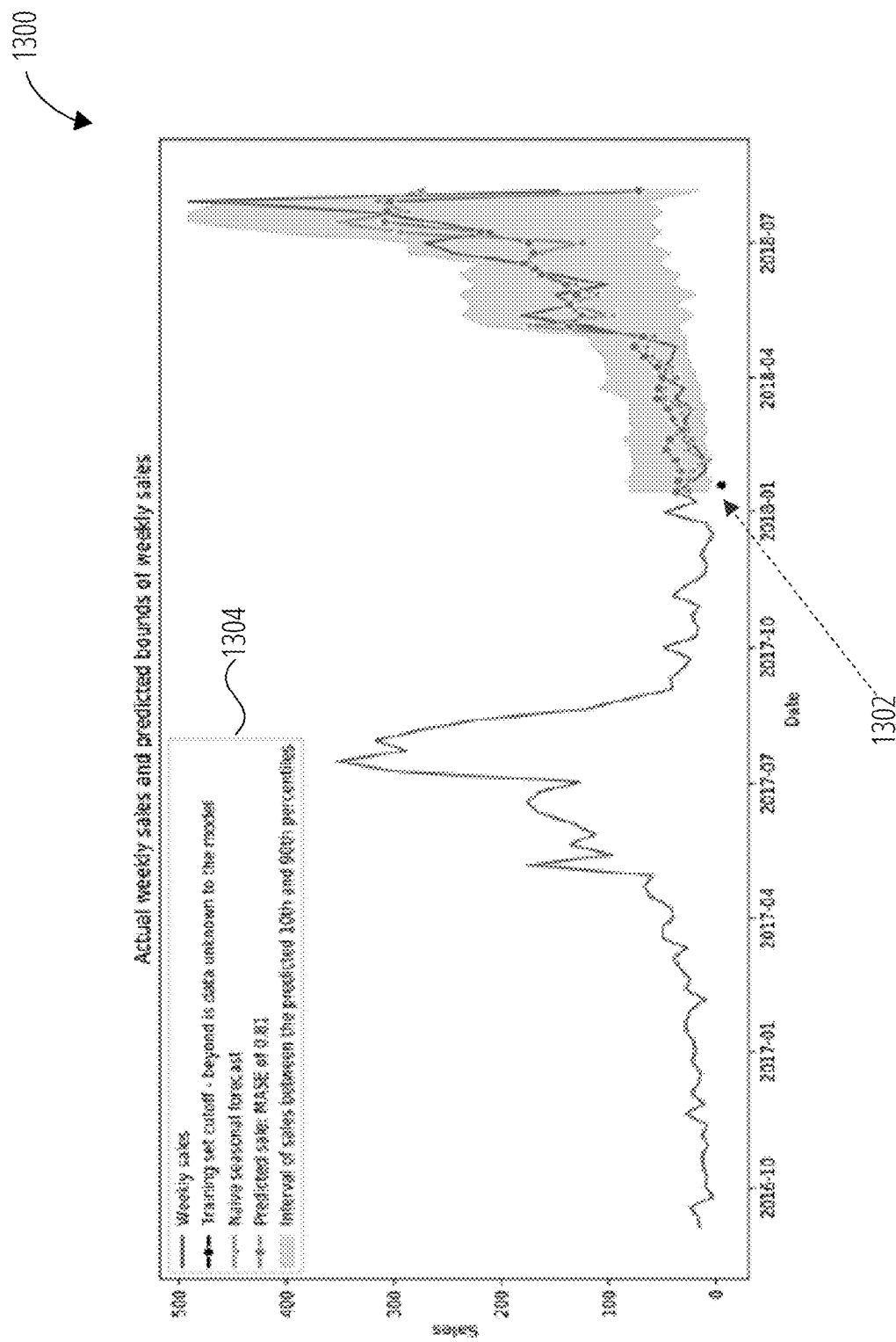
FIG. 13 illustrates a machine learning forecast in accordance with one embodiment.

FIG. 13 illustrates a machine learning forecast 1300 in accordance with one embodiment. In FIG. 13, a request is made for the first time. The sales of the product at a particular store in Kanata is shown on the Y-axis, against a calendar date (from 2016-2018) on the X-axis.

Actual sales are shown (by a solid line) from about September 2016 to August 2018, with sales peaking in 2017 around the month of August, and in 2018 around July-August. Thus, the historical data set is from September 2016 to August 2018, a period of 2 years. The historical data consisted of daily sales at one store for the one product, while external data consisted of holidays (i.e. no weather information, no market indexes).

The total period of initial training and validation is from September 2016 to Jan. 15, 2018, after which, testing takes place (as indicated by black dot 1302). A number of ML models, such as gradient-boosted trees, ensemble of trees and support vector regression, were used during the initial training set. A gradient-boosted tree model, Light GBM, was selected during validation, and retrained on the dataset from September 2016 to Jan. 15, 2018. In this example, all the data, except for the last 20%, was used for training the selected model. In some embodiments, the testing dataset may be the smaller of the dataset of the period of the last 10-20 weeks and the last 20% of the entire dataset. In some embodiments, where the historical data set spans 1 year (52 weeks), the training/validation period can be 40-42 weeks, with remaining 10-12 weeks used for testing the selected model. In some embodiments, a nested validation scheme can be used. The best ML model may be selected according to a configuration set by the user, or any standard criteria such as MASE, MAE, WMAPE (Weighted Mean Absolute Percentage Error), etc.

In FIG. 13, results are shown for the test period of Jan. 15, 2018-Aug. 31, 2018. The forecasted ML results are shown as "predicted sale" (line with solid circles) in the legend table 1304, while the actual sales are labeled as 'weekly sales" (solid line). For comparison, a seasonal forecast (line with solid triangles) is also shown for the test period. The seasonal forecast is implemented by simply copying the weekly sales that happened one year prior. In this example, the season forecast for the weeks of Feb. 20, 2018 to Aug. 31, 2018 is identical to the weekly sales during the weeks of Feb. 20, 2017 to Aug. 31, 2018.

Accuracy of the ML model in FIG. 13 was evaluated relative to the accuracy of the seasonal forecast, using MASE. With the seasonal forecast accuracy normalized to a MASE value of 1.0, the ML model was found to have a MASE value of 0.81; i.e. the ML model was more accurate at predicting weekly sales than the seasonal forecast method.

In addition, FIG. 13 provides an interval of sales between the predicted 10th and 90th percentiles for the ML model. This interval was produced using quantile regression. In some embodiments, a quintile regression approach may not be possible for all ML models. That is, other ML models may use a different scheme (i.e. not quantile regression) to provide such an interval.

Although the algorithms described above including those with reference to the foregoing flow charts have been described separately, it should be understood that any two or more of the algorithms disclosed herein can be combined in any combination. Any of the methods, modules, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well-known manner (e.g., it may be implemented by an application specific integrated circuit (ASIC), a programmable logic device (PLD), a field programmable logic device (FPLD), discrete logic, etc.). Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner and can be used separately or in combination.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method for forecasting daily sales of a product at one or more locations over a time horizon, the method comprising:
   receiving, by a processor, a first forecast request;
   collecting, by the processor, raw data comprising information that relates to, or impacts upon, daily sales of the product at the one or more locations;
   processing, by the processor, the raw data into a data set by at least one of transformation, validation and remediation of the raw data;
   training, by the processor, a plurality of machine learning models on a first portion of the data set;
   validating, by the processor, a machine learning model on a second portion of the data set; and
   retraining, by the processor, the machine learning model on a sum of the first portion and the second portion of the data set, the data set comprising processed historical data;
   forecasting, by the processor, a forecast based on the first forecast request;
   receiving, by the processor, a subsequent forecast request;
   engaging, by the processor, in a machine learning model selection process when:
      i) the data set has been updated by a new class of relevant signal data since a previous forecast request; or
      ii) the data set has been updated by an amount of new relevant signal data beyond a first threshold since the previous forecast request; or
      iii) the machine learning model has degraded;
   and
   retraining, by the processor, a previously-selected machine learning model when a time interval between successive forecast requests is greater than a second threshold.

2. The computer-implemented method of claim 1, wherein the raw data comprises at least one of:
   historical sales data of the product at the one or more locations;
   inventory of the product at the one or more locations;
   weather data related to a respective vicinity of the one or more locations;
   financial market data related to the one or more locations;
   calendar data at the one or more locations; the calendar data comprising one or more local holidays; and local event data;
   promotion campaign details for the product at the on or more locations;
   web data; and
   social media data.

3. The computer-implemented method of claim 1, wherein processing the raw data further comprises:
   generating, by the processor, one or more features, the one or more features comprising data related to at least one of point of sales, weather, one or more events, one or more holidays, a financial market index, web traffic and a promotion of the product.

4. The computer-implemented method of claim 1, wherein when the data set is updated by the new class of relevant signal data, the machine learning model selection process comprises:
   training, by the processor, the plurality of machine learning models on a first portion of an expanded data set, the expanded data set comprising the processed historical data and a processed version of the new class of relevant signal data;
   validating, by the processor, a selected machine learning model on a second portion of the expanded data set; and
   retraining by the processor, the selected machine learning model on a sum total of the first portion of the expanded data set and the second portion of the expanded data set.

5. The computer-implemented method of claim 1, wherein when the data set has been updated by the new relevant signal data beyond the first threshold, the machine learning model selection process comprises:
   training, by the processor, the plurality of machine learning models on a first portion of an expanded data set, the expanded data set comprising the processed historical data and a processed version of the new relevant signal data;
   validating, by the processor, a selected machine learning model on a second portion of the expanded data set; and retraining by the processor, the selected machine learning model on a sum total of the first portion of the expanded data set and the second portion of the expanded data set.

6. The computer-implemented method of claim 1, wherein after forecasting following receipt of the first forecast request, the method further comprises:
   evaluating, by the processor, a forecast accuracy of the forecast against incoming processed historical product data; and
   when the forecast accuracy falls below the second threshold,
   training, by the processor, the plurality of machine learning models on a first portion of an expanded data set, the expanded data set comprising the incoming processed historical product data and the processed historical data;
   validating, by the processor, a selected machine learning model on a second portion of the expanded data set; and
   retraining, by the processor, the selected machine learning model on a sum total of the first portion of the expanded data set and the second portion of the expanded data set.

7. The computer-implemented method of claim 1, wherein when the time interval is beyond the second threshold, retraining the previously-selected machine learning model comprises:
   retraining, by the processor, the previously-selected machine learning model on an expanded data set comprising new processed data collected during the time interval and the processed historical data.

8. A non-transitory computer-readable storage medium, the computer-readable storage medium including instructions that when executed by a computer, cause the computer to:
   receive, by a processor, a first forecast request;
   collect, by the processor, raw data comprising information that relates to, or impacts upon, daily sales of the product at the one or more locations;
   process, by the processor, the raw data into a data set by at least one of transformation, validation and remediation of the raw data;
   train, by the processor, a plurality of machine learning models on a first portion of the data set;
   validate, by the processor, a machine learning model on a second portion of the data set; and
   retrain, by the processor, the machine learning model on a sum of the first portion and the second portion of the data set, the data set comprising processed historical data;
   forecast, by the processor, a forecast based on the first forecast request;
   receive, by the processor, a subsequent forecast request;
   engage, by the processor, in a machine learning model selection process when:
      i) the data set has been updated by a new class of relevant signal data since a previous forecast request; or
      ii) the data set has been updated by an amount of new relevant signal data beyond a first threshold since the previous forecast request; or
      iii) the machine learn model has degraded; and
   retrain, by the processor, a previously-selected machine learning model when a time interval between successive forecast requests is greater than a second threshold.

9. The computer-readable storage medium of claim 8, wherein the raw data comprises at least one of:
   historical sales data of the product at the one or more locations;
   inventory of the product at the one or more locations;
   weather data related to a respective vicinity of the one or more locations;
   financial market data related to the one or more locations;
   calendar data at the one or more locations; the calendar data comprising one or more local holidays; and local event data;
   promotion campaign details for the product at the on or more locations;
   web data; and
   social media data.

10. The computer-readable storage medium of claim 8, wherein when processing the raw data, the instructions that when executed by the computer, further cause the computer to:
    generate, by the processor, one or more features, the one or more features comprising data related to at least one of point of sales, weather, one or more events, one or more holidays, a financial market index, web traffic and a promotion of the product.

11. The computer-readable storage medium of claim 8, wherein when the data set is updated by the new class of relevant signal data, the instructions that when executed by the computer, further cause the computer to:
    train, by the processor, the plurality of machine learning models on a first portion of an expanded data set, the expanded data set comprising the processed historical data and a processed version of the new class of relevant signal data;
    validate, by the processor, a selected machine learning model on a second portion of the expanded data set; and
    retrain by the processor, the selected machine learning model on a sum total of the first portion of the expanded data set and the second portion of the expanded data set.

12. The computer-readable storage medium of claim 8, wherein when the data set has been updated by the new relevant signal data beyond the first threshold, the instructions that when executed by the computer, further cause the computer to:
    train, by the processor, the plurality of machine learning models on a first portion of an expanded data set, the expanded data set comprising the processed historical data and a processed version of the new relevant signal data;
    validate, by the processor, a selected machine learning model on a second portion of the expanded data set; and
    retrain by the processor, the selected machine learning model on a sum total of the first portion of the expanded data set and the second portion of the expanded data set.

13. The computer-readable storage medium of claim 8, wherein after forecasting follow receipt of the first forecast request, the instructions that when executed by the computer, further cause the computer to:
    evaluate, by the processor, a forecast accuracy of the forecast against incoming processed historical product data; and
    when the forecast accuracy falls below the second threshold,
    train, by the processor, the plurality of machine learning models on a first portion of an expanded data set, the expanded data set comprising the incoming processed historical product data and the processed historical data;

validate, by the processor, a selected machine learning model on a second portion of the expanded data set; and retrain, by the processor, the selected machine learning model on a sum total of the first portion of the expanded data set and the second portion of the expanded data set.

14. The computer-readable storage medium of claim 8, wherein when the time interval is beyond the second threshold, the instructions that when executed by the computer, further cause the computer to:

retrain, by the processor, the previously-selected machine learning model on an expanded data set comprising new processed data collected during the time interval and the processed historical data.

15. A system comprising:

a processor; and a memory storing instructions that, when executed by the processor, configure the system to:

receive, by the processor, a first forecast request;

collect, by the processor, raw data comprising information that relates to, or impacts upon, daily sales of the product at the one or more locations;

process, by the processor, the raw data into a data set by at least one of transformation, validation and remediation of the raw data;

train, by the processor, a plurality of machine learning models on a first portion of the data set;

validate, by the processor, a machine learning model on a second portion of the data set; and retrain, by the processor, the machine learning model on a sum of the first portion and the second portion of the data set, the data set comprising processed historical data;

forecast, by the processor, a forecast based on the first forecast request;

receive, by the processor, a subsequent forecast request;

engage, by the processor, in a machine learning model selection process when:
  i) the data set has been updated by a new class of relevant signal data since a previous forecast request; or
  ii) the data set has been updated by an amount of new relevant signal data beyond a first threshold since the previous forecast request; or
  iii) the machine learn model has degraded; and retrain, by the processor, a previously-selected machine learning model when a time interval between successive forecast requests is greater than a second threshold.

16. The system of claim 15, wherein the raw data comprises at least one of:

historical sales data of the product at the one or more locations;

inventory of the product at the one or more locations;

weather data related to a respective vicinity of the one or more locations;

financial market data related to the one or more locations;

calendar data at the one or more locations; the calendar data comprising one or more local holidays; and local event data;

promotion campaign details for the product at the on or more locations;

web data; and social media data.

17. The system of claim 15, wherein processing the raw data, the system is further configured to:

generate, by the processor, one or more features, the one or more features comprising data related to at least one of point of sales, weather, one or more events, one or more holidays, a financial market index, web traffic and a promotion of the product.

18. The system of claim 15, wherein when the data set is updated by the new class of relevant signal data, the system is further configured to:

train, by the processor, the plurality of machine learning models on a first portion of an expanded data set, the expanded data set comprising the processed historical data and a processed version of the new class of relevant signal data;

validate, by the processor, a selected machine learning model on a second portion of the expanded data set; and retrain by the processor, the selected machine learning model on a sum total of the first portion of the expanded data set and the second portion of the expanded data set.

19. The system of claim 15, wherein when the data set has been updated by the new relevant signal data beyond the first threshold, the system is further configured to:

train, by the processor, the plurality of machine learning models on a first portion of an expanded data set, the expanded data set comprising the processed historical data and a processed version of the new relevant signal data;

validate, by the processor, a selected machine learning model on a second portion of the expanded data set; and retrain by the processor, the selected machine learning model on a sum total of the first portion of the expanded data set and the second portion of the expanded data set.

20. The system of claim 15, wherein after forecasting follow receipt of the first forecast request, the system is further configured to:

evaluate, by the processor, a forecast accuracy of the forecast against incoming processed historical product data; and when the forecast accuracy falls below the second threshold, train, by the processor, the plurality of machine learning models on a first portion of an expanded data set, the expanded data set comprising the incoming processed historical product data and the processed historical data;

validate, by the processor, a selected machine learning model on a second portion of the expanded data set; and retrain, by the processor, the selected machine learning model on a sum total of the first portion of the expanded data set and the second portion of the expanded data set.

21. The system of claim 15, wherein when the time interval is beyond the second threshold, the system is further configured to:

retrain, by the processor, the previously-selected machine learning model on an expanded data set comprising new processed data collected during the time interval and the processed historical data.

* * * * *